United States Patent
Lahnala et al.

(10) Patent No.: US 10,119,323 B2
(45) Date of Patent: Nov. 6, 2018

(54) ENCAPSULATED GLASS FRAME ASSEMBLIES AND ASSOCIATED METHODS FOR FORMING SAME

(71) Applicants: AGC Automotive Americas R&D, Inc., Ypsilanti, MI (US); AGC Flat Glass North America, Inc., Alpharetta, GA (US)

(72) Inventors: David W. Lahnala, Adrian, MI (US); Daniel Bennett, Tecumseh, MI (US); Brian Kinross, Florence, KY (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 0 days.

(21) Appl. No.: 15/486,474

(22) Filed: Apr. 13, 2017

(65) Prior Publication Data
US 2018/0119478 A1    May 3, 2018

Related U.S. Application Data

(60) Provisional application No. 62/415,995, filed on Nov. 1, 2016.

(51) Int. Cl.
*E06B 1/26* (2006.01)
*B60J 1/00* (2006.01)
(Continued)

(52) U.S. Cl.
CPC .......... *E06B 1/26* (2013.01); *B29C 45/14377* (2013.01); *B60J 1/007* (2013.01);
(Continued)

(58) Field of Classification Search
CPC ............ E06B 1/26; E06B 3/5454; B60J 1/007
See application file for complete search history.

(56) References Cited

U.S. PATENT DOCUMENTS 2,587,354 A * 2/1952 Mauck ........................ B60J 1/14
296/154
2,606,059 A * 8/1952 Wernig ........................ B60J 1/14
49/144
(Continued)

FOREIGN PATENT DOCUMENTS

DE    3203580 A1    9/1983
DE    3932724 A1    4/1991
(Continued)

OTHER PUBLICATIONS

English language abstract and machine-assisted English translation for DE 32 03 580 extracted from espacenet.com database on Nov. 6, 2017, 9 pages.
(Continued)

*Primary Examiner* — Jeanette E Chapman
(74) *Attorney, Agent, or Firm* — Howard & Howard Attorneys PLLC

(57) ABSTRACT

An encapsulated glass assembly includes a glass panel and a plastic frame and a clip. The frame has at least three frame sides and has a lower wall portion extending from an outer wall surface along each of the at least three frame sides. The clip has a C-shaped clip channel and is coupled to a first frame side of the frame such that a portion of the panel is retained within the C-shaped clip channel. An optional clip can be coupled to a second frame side. The plastic frame can alternatively include a C-shaped channel on the second frame side, wherein another portion of the panel is retained within the C-shaped channel. An encapsulant is bonded onto the panel, the frame, and the clip to secure the frame to the
(Continued)

panel. The encapsulant has a Shore hardness less than the Shore hardness of the frame.

26 Claims, 18 Drawing Sheets

(51) Int. Cl.
*E06B 3/54* (2006.01)
*B29C 45/14* (2006.01)
*B60J 1/10* (2006.01)
*B60J 10/18* (2016.01)
*B60J 10/32* (2016.01)
*B60J 10/70* (2016.01)

(52) U.S. Cl.
CPC .............. *B60J 1/10* (2013.01); *B60J 10/18* (2016.02); *B60J 10/32* (2016.02); *B60J 10/70* (2016.02); *E06B 3/5454* (2013.01)

(56) References Cited

U.S. PATENT DOCUMENTS

| | | | | |
|---|---|---|---|---|
| 2,723,427 A * | 11/1955 | Bobel | ............... | E06B 3/5409 52/204.593 |
| 3,274,740 A * | 9/1966 | Hall | ............... | B60J 1/006 296/96.21 |
| 3,388,698 A * | 6/1968 | Satkunas | ............... | F23M 7/00 126/200 |
| 4,524,978 A * | 6/1985 | Mauser | ............... | E06B 3/305 277/637 |
| 4,671,013 A | 6/1987 | Friese et al. | | |
| 4,947,606 A * | 8/1990 | La See | ............... | E06B 3/5892 49/171 |
| 5,617,695 A | 4/1997 | Brimmer | | |
| 5,628,155 A | 5/1997 | Nolte et al. | | |
| 5,713,167 A * | 2/1998 | Durham | ............... | E06B 1/345 52/204.54 |
| 5,944,324 A | 8/1999 | Schultheis et al. | | |
| 5,997,793 A * | 12/1999 | Lahnala | ............... | B29C 45/14377 264/252 |
| 6,223,470 B1 | 5/2001 | Millard et al. | | |
| 6,409,251 B1 | 6/2002 | Kaye et al. | | |
| 6,766,617 B2 | 7/2004 | Purcell | | |
| 7,219,470 B2 * | 5/2007 | Lahnala | ............... | B60J 1/1853 16/95 R |
| 7,395,631 B2 * | 7/2008 | Lahnala | ............... | B60J 1/1853 49/127 |
| 7,934,342 B2 * | 5/2011 | Lahnala | ............... | B60J 1/1853 49/380 |
| 8,127,498 B2 * | 3/2012 | Lahnala | ............... | B60J 1/1853 49/380 |
| 8,322,075 B2 * | 12/2012 | Lahnala | ............... | E05D 15/0686 49/380 |
| 8,388,043 B2 * | 3/2013 | Lahnala | ............... | B60J 1/1853 296/146.16 |
| 8,595,981 B2 * | 12/2013 | Lahnala | ............... | B60J 1/1853 49/380 |
| 8,844,203 B2 * | 9/2014 | Lahnala | ............... | E05D 15/0686 49/125 |
| 9,126,474 B2 | 9/2015 | Cicala | | |
| 9,211,780 B2 * | 12/2015 | Lahnala | ............... | B60J 1/1861 |
| 9,463,684 B2 * | 10/2016 | Lahnala | ............... | E05D 15/0621 |
| 9,878,599 B2 * | 1/2018 | Lahnala | ............... | B60J 1/1853 |
| 9,920,566 B1 * | 3/2018 | Bennett | ............... | B60J 1/007 |
| 2010/0122495 A1 | 5/2010 | Lahnala | | |
| 2011/0214717 A1 | 9/2011 | Halahmi et al. | | |
| 2012/0139289 A1 | 6/2012 | Lahnala | | |
| 2013/0185973 A1 | 7/2013 | Scheyer et al. | | |
| 2014/0165343 A1 * | 6/2014 | Gibbs | ............... | F16B 2/22 24/542 |
| 2014/0230333 A1 | 8/2014 | Lahnala | | |

FOREIGN PATENT DOCUMENTS

| | | | | |
|---|---|---|---|---|
| DE | 4008702 A1 | 9/1991 | | |
| EP | 0076924 A2 | 4/1983 | | |
| FR | 799711 A * | 6/1936 | ............... | B60J 10/70 |
| FR | 2970756 A1 | 7/2012 | | |
| GB | 484765 A * | 5/1938 | ............... | E06B 3/5828 |

OTHER PUBLICATIONS

English language abstract and machine-assisted English translation for DE 39 32 724 extracted from espacenet.com database on Nov. 6, 2017, 6 pages.

English language abstract and machine-assisted English translation for DE 40 08 702 extracted from espacenet.com database on Nov. 6, 2017, 9 pages.

English language abstract and machine-assisted English translation for EP 0 076 924 extracted from espacenet.com database on Nov. 6, 2017, 12 pages.

English language abstract and machine-assisted English translation for FR 2 970 756 extracted from espacenet.com database on Nov. 6, 2017, 9 pages.

Hexpol Group, "Dryflex, Mediprene, Lifoflex—TPE Processing Guide", downloaded from http://www.hexpoltpe.com/getfile.php?type=site_documents&id=tpe-processing-guide.pdf in May 2016, pp. 1-10.

* cited by examiner

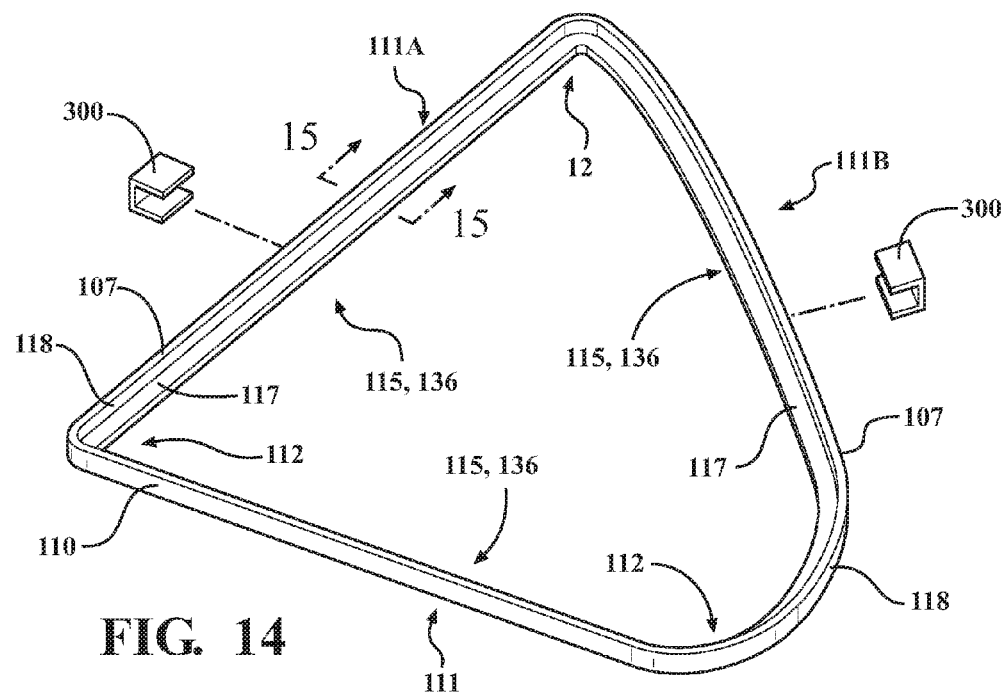
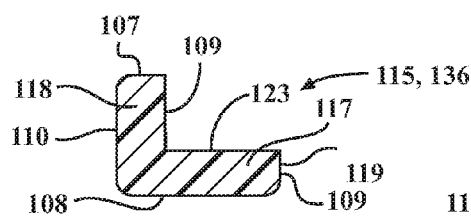
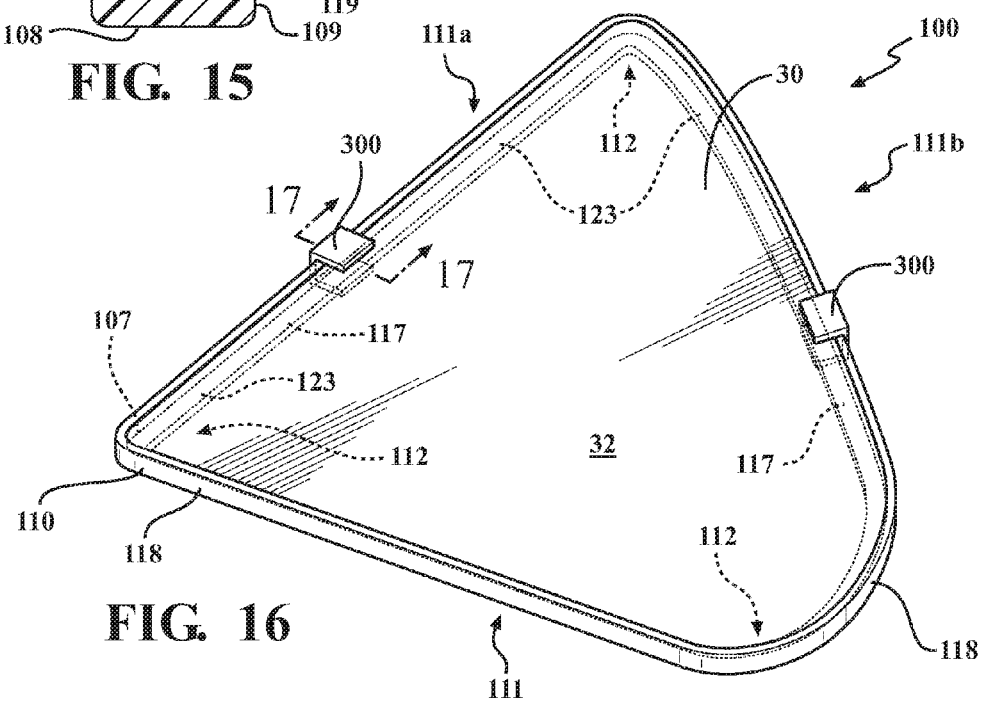

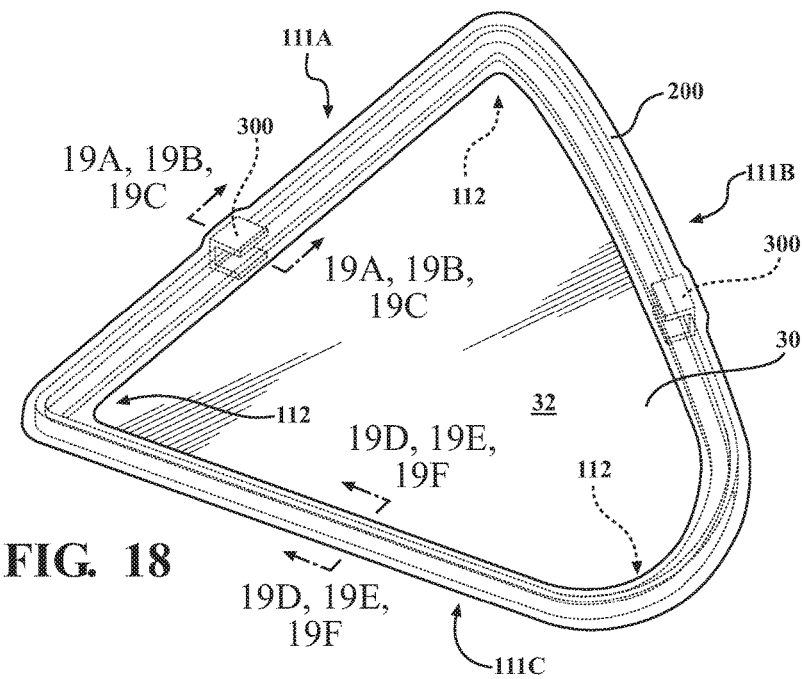
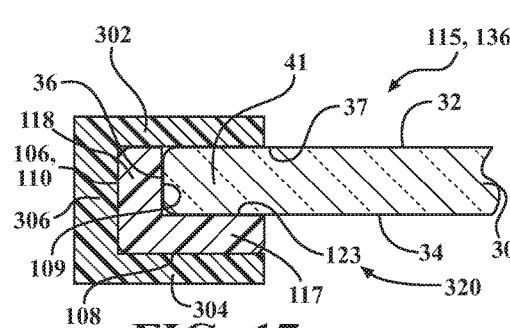
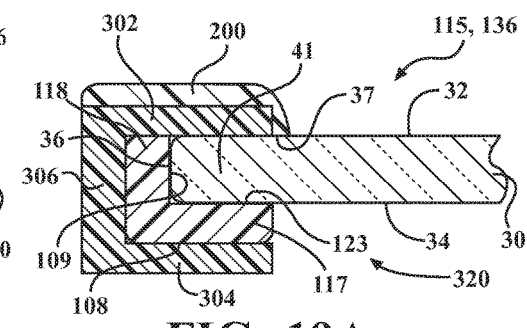
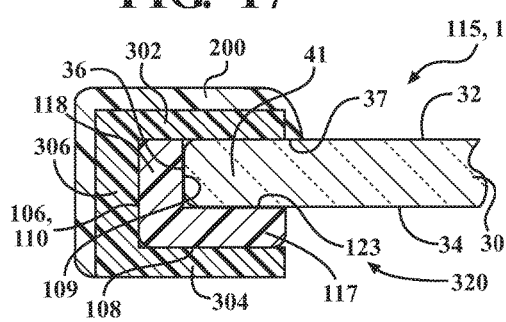
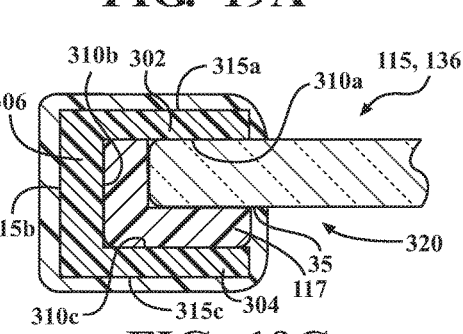

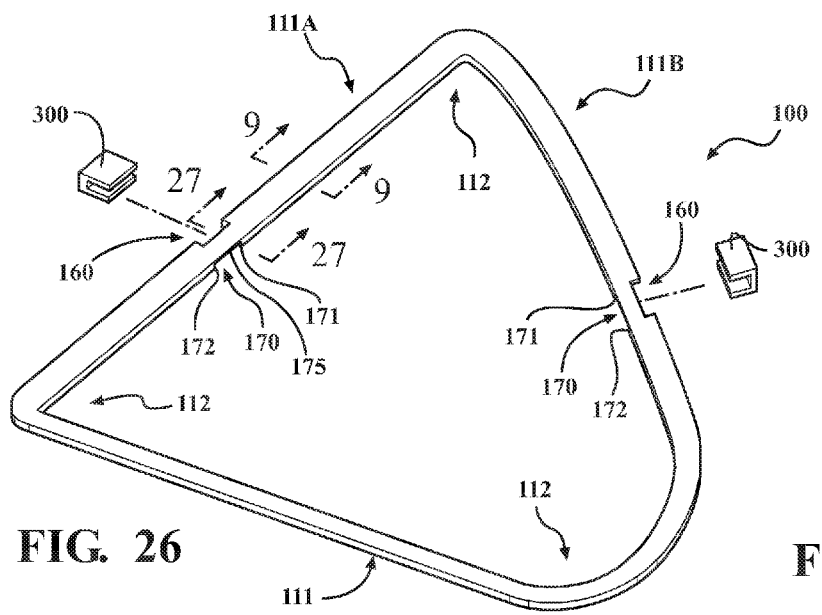
FIG. 26
FIG. 29
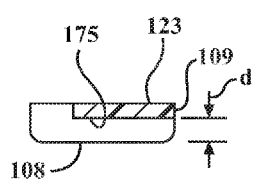
FIG. 27
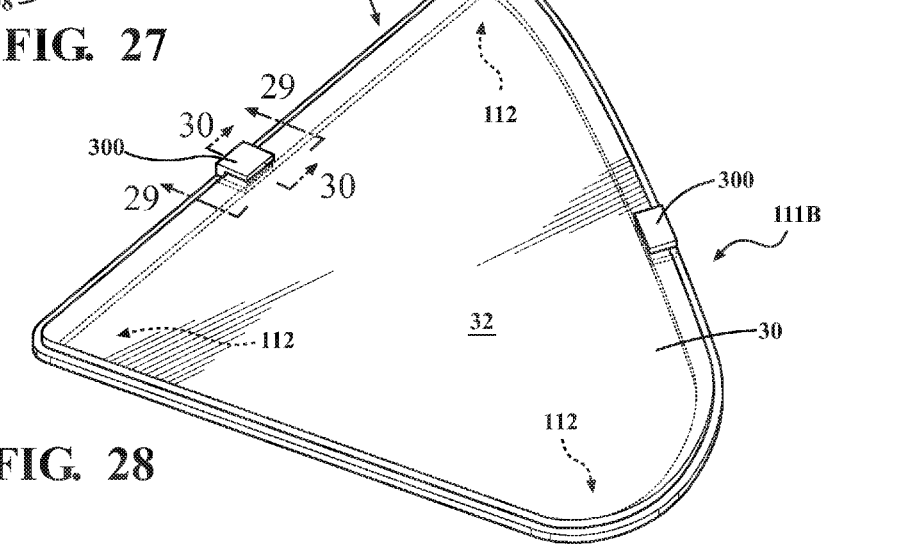
FIG. 28

ENCAPSULATED GLASS FRAME ASSEMBLIES AND ASSOCIATED METHODS FOR FORMING SAME

CROSS-REFERENCE TO RELATED APPLICATIONS

This application claims priority to and all advantages of U.S. Provisional Application No. 62/415,995, filed on Nov. 1, 2016, the content of which is incorporated by reference.

BACKGROUND OF THE INVENTION

1. Field of the Invention

The subject invention generally relates to encapsulated glass frame assemblies and associated methods for forming glass frame assemblies.

2. Description of the Related Art

Polymeric encapsulants for encapsulated glass frame assemblies (sometimes referred to as window assemblies), such as those used on vehicles, are generally known in the art. Generally, these encapsulated glass frame assemblies include a transparent pane, commonly made from glass (i.e., a glass panel). The polymeric encapsulant is bonded to the perimeter of the glass panel to form a frame for the glass panel. The polymeric encapsulant can be bonded to one, two, or three surfaces of the transparent pane.

The polymeric encapsulants can be formed from either a thermosetting material or a thermoplastic encapsulating material. Exemplary thermosetting encapsulating materials include, for example, a reaction injection molded (RIM) material, while exemplary thermoplastic encapsulating materials include, for example, polypropylene (PP), polyvinylchloride (PVC) or thermoplastic elastomers (TPEs). Non-limiting examples of TPE elastomers that can be used as the encapsulating material include SBS (poly(styrene-butadiene-styrene), also alternatively referred to as a styrene-butadiene-styrene block copolymer) and SEBS (styrene-ethylene-butylene-styrene block copolymers).

In certain applications, the polymeric encapsulant is applied in a single application step, and therein forms a one-shot encapsulant. In other applications, the polymeric encapsulant is applied in two separate applications steps with two separate polymeric materials, and therein forms a two-shot encapsulant having a first encapsulation layer and a second encapsulation layer such that the first encapsulation layer is between the transparent pane and the second encapsulation layer.

While such encapsulated glass frame assemblies including one-shot or two-shot encapsulants are generally suitable for their intended purpose, these encapsulated glass frame assemblies do suffer from a variety of known deficiencies related to bonding strength and structural rigidity of the formed encapsulants functioning as frames for the glass panels.

For example, certain encapsulating materials, such as TPE, bond well to the glass (with the use of adhesion promoters) and therefore prevent water from migrating between the applied encapsulant and the glass. TPE-based encapsulants also provide good sealing to the vehicle body because it is softer. However, because the TPE-based encapsulants are softer, they do not provide structural rigidity that allows the TPE-based encapsulants to fix the glass strongly to the vehicle.

Conversely, other encapsulating materials, such as polypropylene, form encapsulants providing enhanced structural rigidity relative to TPE-based encapsulants, and therefore can fix the glass strongly to the vehicle. However, polypropylene does not bond well to the glass itself, and therefore polypropylene-based encapsulants do not provide good sealing between the applied encapsulant and glass to prevent water from migrating between the polypropylene encapsulant and glass. Still further, in one example that is representative of general formation conditions for forming encapsulated glass frame assemblies with these other encapsulating materials providing the desired structural rigidity, polypropylene-based encapsulants require the use of an injection molding process to apply the polypropylene to the glass that requires both high barrel temperatures (ranging generally from about 400 to 450 degrees Fahrenheit (about 200 to 235 degrees Celsius)) and high injection pressures (ranging generally from about 6600 to 7250 pounds per square inch (about 4.62 to 5.20 MPa (MegaPascals))), with these temperatures and pressures being application dependent. Such high temperatures and pressures can result in the breakage of the glass panel during the injection molding process, particularly when the glass panel is a laminated glass panel.

The present invention addresses many of the deficiencies found in such encapsulated glass frame assemblies.

SUMMARY OF THE INVENTION AND ADVANTAGES

The invention provides encapsulated glass frame assemblies having as its major components a glass panel, a plastic frame, at least one clip, and an encapsulant.

The encapsulated glass assembly comprises a glass panel having a first side and a second side and an edge between the first side and the second side. In addition, the encapsulated glass assembly comprises a plastic frame coupled to the glass panel. The plastic frame has at least three frame sides and has a corner located between each adjacent pair of the at least three frame sides. The plastic frame includes an outer frame surface, and the outer frame surface includes a lower wall portion extending from the outer frame surface along each of the at least three frame sides. The lower wall portion includes a lower surface.

In certain embodiments, a first frame side and a second frame side of the plastic frame each include the aforementioned lower side portion. In these embodiments, a clip is coupled to the first frame side of the at least three frame sides of the plastic frame and optionally an additional clip, the same or different than the clip, is coupled to the second frame side of the at least the frame sides. In these embodiments, the clip and the optional additional clip each comprise an upper clip portion, a lower clip portion and a middle clip portion connecting the upper clip portion to the lower clip portion, wherein an inner clip surface of the middle clip portion, the upper clip portion and the lower clip portion of the clip defines a first C-shaped clip channel and wherein an inner clip surface of the middle clip portion, the upper clip portion and the lower clip portion of the additional clip defines a second C-shaped clip channel. In addition, each of the clip and the optional additional clip include an outer clip surface opposite the respective inner clip surface. When the glass panel is coupled to the plastic frame, a portion of the glass panel is contained within the first C-shaped clip channel and another portion of the glass panel is coupled within the second C-shaped clip channel (if present). Finally, an encapsulant is bonded onto at least one of the first side and the second side of the glass panel, the outer frame surface of the plastic frame, the outer clip surface of the clip and the additional clip to secure the glass panel to the plastic frame. The encapsulant has a Shore hardness less than a Shore hardness of the plastic frame (i.e., the encapsulant is softer than the plastic frame).

In alternative embodiments, as opposed to including an additional clip to retain another portion of the glass panel within the second C-shaped clip channel prior to securing the plastic frame to the glass panel with the encapsulant, a second frame side of the at least three sides of the plastic frame instead includes a side wall portion connected to the lower wall portion and at least one upper wall portion extending from a portion of an upper length of the side wall portion on the second frame side, each one of the at least one upper wall portions spaced from the lower wall portion. In these embodiments, an inner surface of one of the upper wall portions, the side wall portion and the lower wall portion define a C-shaped channel along the second frame of the plastic frame. In these alternative embodiments, another portion of the glass panel is coupled within the respective C-shaped channel or channels along the second frame side as opposed to being coupled within the second C-shaped clip channel of the first embodiment.

In yet further embodiments, the first frame side, and optionally a third frame side, of the at least three frame sides of the first or second embodiment can include a side wall portion connected to the lower wall portion so as to define an L-shaped channel. In these embodiments, when the glass panel is coupled to the plastic frame, the edge of the glass panel is positioned adjacent to an inner surface of the side wall portion of each respective L-shaped channel.

In still further embodiments, an inlet region can be included in the lower wall portion of the first frame side (and optionally in the second frame side of the first embodiment which does not include the C-shaped channel). In these embodiments, the clip is coupled within the inlet region on the first frame side of the plastic frame, and the additional clip is coupled within the inlet region on the second frame side of the frame (when present).

In yet still further embodiments, a recessed region can be included in the lower wall portion of the first frame side (and optionally in the second frame side of the first embodiment which does not include the C-shaped channel). In these embodiments, the lower clip portion of the clip is positioned within the recessed region on the first frame side, and the lower clip portion of the additional clip is positioned within the recessed region on the second frame side, to aid in coupling the clip and additional clip to the plastic frame. Relatedly, the recessed region can also be included on the lower wall portion of the first frame side including the inlet region (as described in the previous paragraph).

In even still further embodiments, an inlet region can be included in the side wall portion and in the lower wall portion of the first frame side of the plastic fame having an L-shaped channel (and optionally in the second frame side having an L-shaped channel which does not include the C-shaped channel). In these embodiments, the clip is coupled within the inlet region on the first frame side of the plastic frame, and the additional clip is coupled within the inlet region on the second frame side of the frame (when present)

In even still further embodiments, a recessed region can be included in the lower wall portion of the first frame side (and optionally in the second frame side of the first embodiment which does not include the C-shaped channel) of the plastic frame that has an L-shaped channel. In these embodiments, the lower clip portion of the clip is positioned within the recessed region on the first frame side, and the lower clip portion of the additional clip is positioned within the recessed region on the second frame side, to aid in coupling the clip and additional clip to the plastic frame. Relatedly, the recessed region can also be included on the lower wall portion of the first frame side including the inlet region (as described in the previous paragraph).

In certain embodiments, the glass panel is a laminated glass panel, while in other embodiments the glass panel is a tempered glass panel.

The present invention also provides methods for forming the encapsulated glass assemblies having the features in accordance with any of the embodiments described above.

The present invention thus provides simplified encapsulated glass assemblies having high strength and a simplified manufacturing process. In addition, the coupling of the plastic frame in accordance with the present invention forms encapsulated glass assemblies with high strength that cannot be reliably achieved using the one-shot or two-shot encapsulation techniques as described above. Still further, the application of the encapsulant onto the glass panel and frame to secure the glass panel to the frame in accordance with the present invention may be done at lower temperatures and pressures than required to bond high hardness plastic materials such as polypropylene to the glass panel, thus minimizing or preventing the breakage of the glass panels during the application process. Accordingly, the present invention allows the use of lower strength and better acoustical glass panels, such as laminated glass panels, in this manufacturing process. Still further, the encapsulant also provides a sealing and strong bond between the encapsulant and the glass panel, thus prevent minimizing or preventing water or other liquids from migrating between the applied encapsulant and glass panel prior to use or during use wherein the glass assembly is installed within a vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 14 is a perspective view of a plastic frame and a pair of clips for use in the encapsulated glass assembly in accordance with another embodiment of the present invention;

FIG. 15 is a section view of FIG. 14 taken along line 15-15;

FIG. 16 is a perspective view of a glass panel coupled to the plastic frame of FIG. 14 and including a pair of coupled clips prior to encapsulation in accordance with one embodiment of the present invention;

FIG. 17 is a section view of FIG. 16 taken along line 17-17;

FIG. 18 is a perspective view of an encapsulated glass frame assembly including the plastic frame and clips of FIG. 14;

FIG. 19A is a section view of FIG. 18 taken along line 19A-19A and including a one-sided encapsulant;

FIG. 19B is a section view of FIG. 18 taken along line 19B-19B and including a two-sided encapsulant;

FIG. 19C is a section view of FIG. 18 taken along line 19C-19C and including a three-sided encapsulant;

FIG. 26 is a perspective view of a plastic frame and a pair of clips for use in the encapsulated glass assembly in accordance with still another embodiment of the present invention;

FIG. 27 is a section view of FIG. 26 taken along line 27-27;

FIG. 28 is a perspective view of a glass panel coupled to the plastic frame of FIG. 26 and including a pair of coupled clips prior to encapsulation;

FIG. 29 is a section view of FIG. 28 taken along line 29-29;

DETAILED DESCRIPTION OF THE INVENTION

Referring to the Figures, wherein like numerals indicate corresponding parts throughout the several views, the present invention is directed to an encapsulated glass assembly 25 that may be used in a variety of applications. As illustrated herein, the encapsulated glass assembly 25 is included in a vehicle, such as an automobile.

Figure 1:
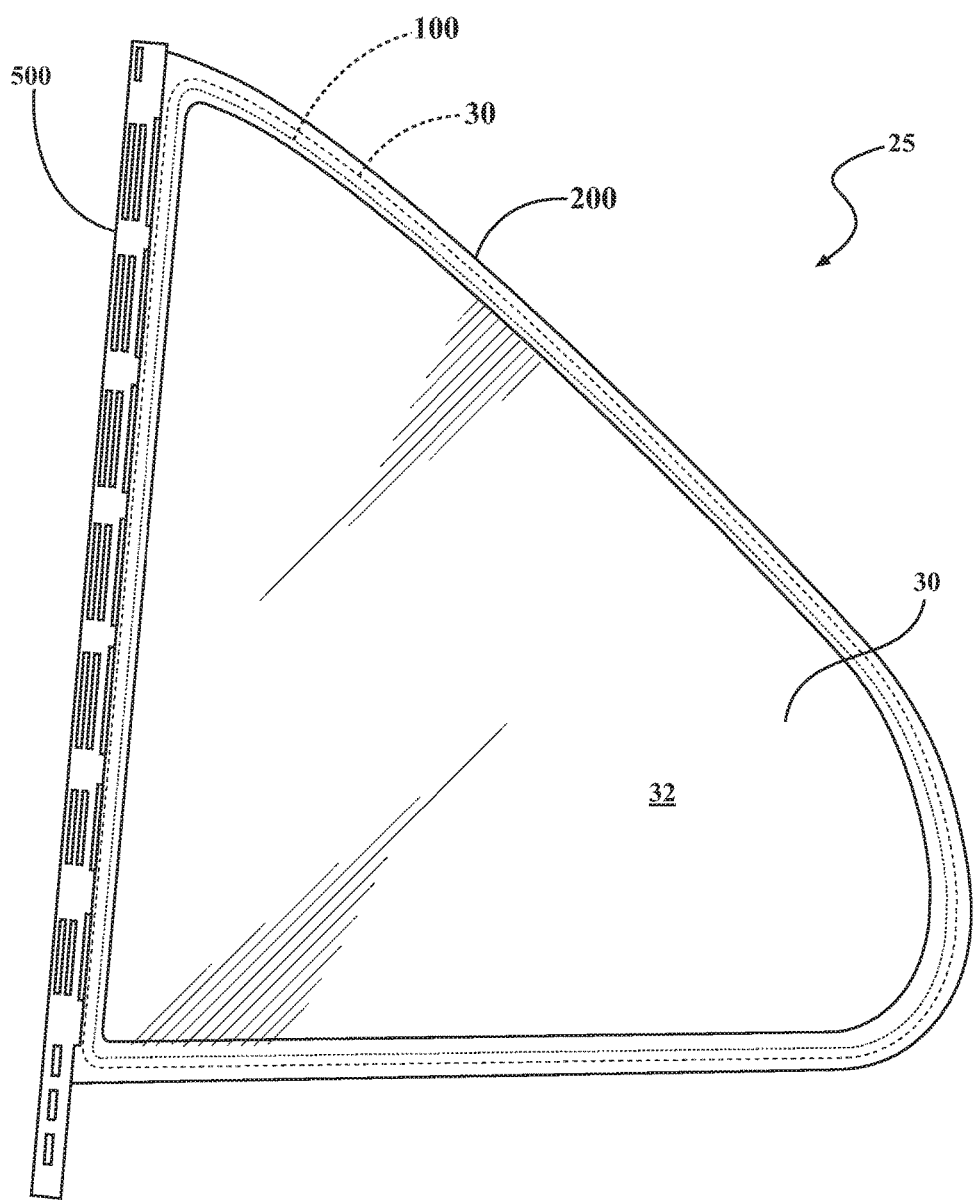
FIG. 1 is a perspective view of a glass assembly in accordance with one embodiment of the present invention.

Referring now to FIG. 1, the encapsulated glass assembly 25 includes, as its major components, a glass panel 30 coupled to a plastic frame 100. In addition, the encapsulated glass assembly 25 includes an encapsulant 200 that bonds to both the glass panel 30 and frame 100 and thus functions to secure the plastic frame 100 to the glass panel 30. Accordingly, the encapsulant 200 effectively functions as a second frame and may be alternatively referred to herein as a second frame. Still further, the encapsulated glass assembly 25 includes at least one clip 300 that aids in retaining the glass panel 30 to the plastic frame 100 prior to the application of the encapsulant 200.

As also shown in FIG. 1, the encapsulated glass assembly 25 may be coupled to, attached to, or is otherwise secured to a support frame 500. Alternatively, the support frame 500 may be integral with the plastic frame 100 (i.e., the support frame 500 and frame 100 are formed as a single component and not two separate components). The support frame 500 is contained within the vehicle (not shown), and thus the encapsulated glass assembly 25 may function as a window for the vehicle. In certain embodiment, the encapsulated glass assembly 25 is a side window coupled to the A-pillar of the vehicle adjacent to the driver's side or passenger side window, while in other embodiments the glass assembly is a side window that is coupled to the C-pillar of the vehicle adjacent to the rear passenger side windows. In still further embodiments, the encapsulated glass assembly 25 may be included as a side portion of the front windshield.

Figure 2:
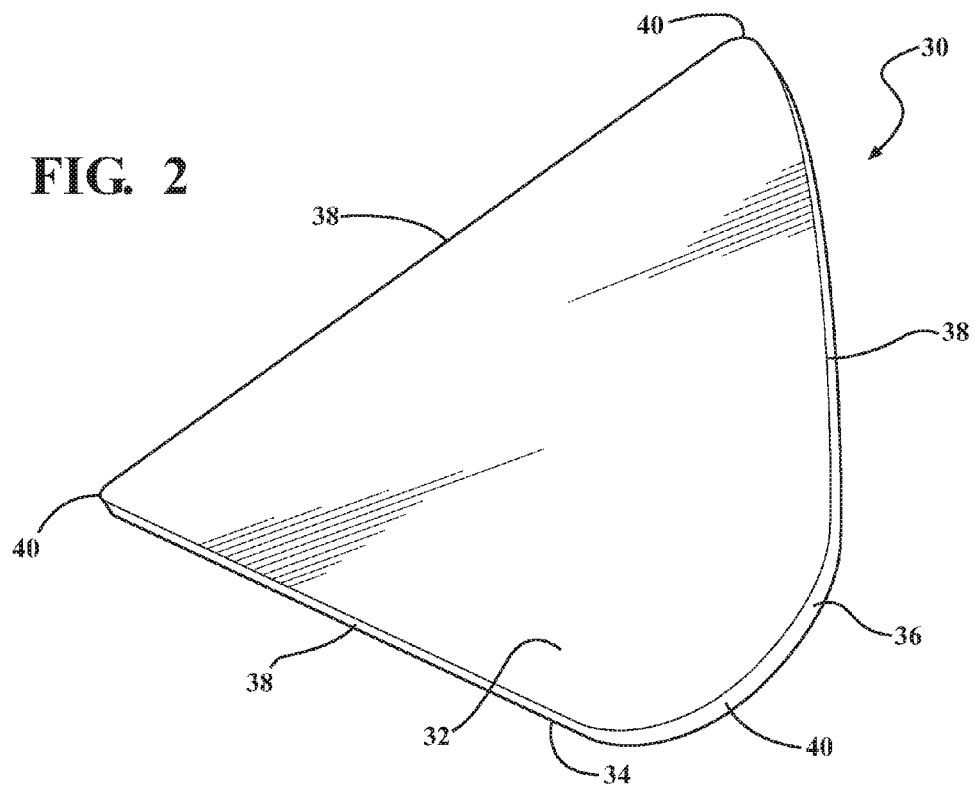
FIG. 2 is a perspective view of the glass panel of FIG. 1.

Referring to FIG. 2, the glass panel 30 includes, in general, a first side 32 and a second side 34 and an edge 36 between the first side 32 and the second side 34. Typically, when the glass panel 30 is installed within the vehicle (not shown), one side (i.e., one of the first side 32 or the second side 34) of the glass panel 30 is positioned towards the passenger compartment of the vehicle, and thus may define a portion of the passenger compartment, while the other side (i.e., the other one of the first side 32 or the second side 34) is positioned outwardly from the vehicle and away from the passenger compartment.

The glass panel 30 may be formed in any shape depending upon its use. Thus, for example, the glass panel 30 may be formed having at least three sides 38 defined along the edge 36. In these embodiments, each adjacent pair of the sides 38 may be connected by transition regions, or corners 40 (i.e., wherein the sides 38 and corners 40 collectively define the shape of the glass panel 30). Accordingly, in embodiments having three sides 38, such as when used as the side windows coupled to either the A-pillar or C-pillar of the vehicle through the support frame 500 as described above, the glass panel 30 may be triangular shaped. Still further, in embodiments have four sides 38 and four corners 40, the glass panel 30 may have a generally square or rectangular shape or may have another quadrilateral shape that does not generally define a square or rectangle. In these embodiments, the corners 40 may form abrupt transitions between sides 38 or may be generally rounded between the sides 38. In still further embodiments, the segment of the plastic frame 100 corresponding to one of the sides 38 may be straight along its length (as in a triangle or square), may be rounded, or may take on any other respective shape along the length of the side 38. Still further, in other embodiments, the transitions along the corners 40 may be slightly rounded or perfectly rounded, (i.e., less or not abrupt). In these embodiments, the sides 38 may correspond in roundness to the corners, and thus form round or oval parts to correspond to the round or oval shape of the glass panel 108. Thus, for example, wherein the glass panel 30 is round or oval, the sides 38 correspond to segments of a round or oval shaped plastic frame 100, and the corners 40 represent round or oval transitional segments between the respective round or oval segments. For illustrative purposes, the glass panel 30 in the embodiments illustrated herein have a triangular shape including three sides 38 and three corresponding corners 40, with one corner 40 positioned between each pair of adjacent sides 38.

Figure 3:
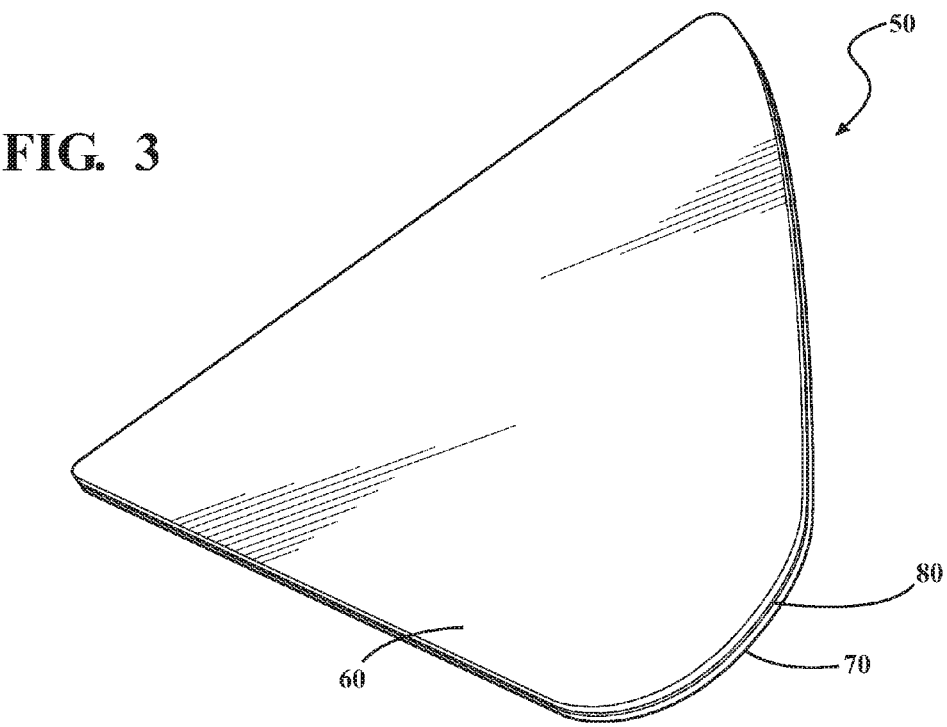
FIG. 3 is a perspective view of a laminated glass panel for use in the glass assembly of one embodiment of the present invention.

In certain embodiments, the glass panel 30 is in the form of a laminated window assembly 50. As shown best in FIGS. 3 and 4, the laminated glass panel 50 includes an inner transparent sheet 60 and an outer transparent sheet 70 and an interlayer 80 disposed between the inner transparent sheet 50 and the outer transparent sheet 70.

In certain embodiments, the inner and outer transparent sheets 60, 70 are panes of glass that are substantially transparent. However, in other embodiments, the inner and outer transparent sheets 60, 70 may be plastic, fiberglass, or any other suitable substantially transparent material. As defined herein, the term "substantially transparent", as used with respect to the transparent sheets 60 and 70, refers to a material that allows 70% or more of light transmission in a predefined wavelength range, such as the visible light range. The panes of glass are preferably automotive glass and, more specifically, soda-lime-silica glass. However, in other embodiments, the inner and outer transparent sheets 60, 70 may be plastic, fiberglass, or other suitable substantially transparent material.

In other embodiments, the inner and outer transparent sheets 60, 70 are panes of glass that are less transparent. For example, wherein the glass assembly is a privacy glass, the transparency of the glass is substantially reduced, and thus allows less than 70% light transmission in a predefined wavelength range, such as from greater than 0 to 70% light transmission at the predefined wavelength range. As used hereinafter, the term transparent, as it relates to the transparent sheets 60 or 70 or interlayer 80 of the present invention, or more generally as it relates to the glass panel 30, refers to a sheet or panel having at least some degree of transparency at the predefined wavelength range and is not intended to be limited to substantial transparent as defined in the previous paragraph.

Figure 4:
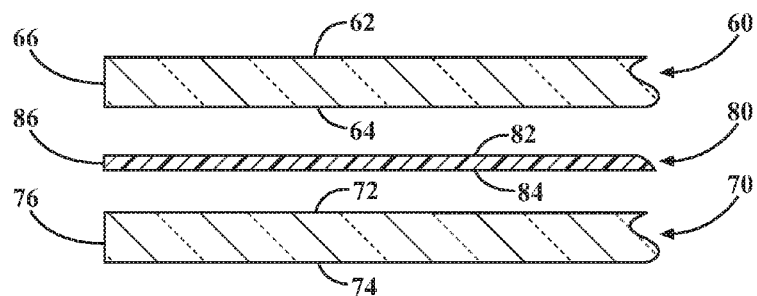
FIG. 4 is a side exploded view of FIG. 2.

As best shown in FIG. 4, the inner transparent sheet 60 includes a first side 62 and a second side 64 and an edge 66 defined between the first and second sides 62, 64. Similarly, the outer transparent sheet 70 includes a first side 72 and a second side 74 and an edge 76 defined between the first and second sides 72, 74.

As noted above, the laminated glass panel 50 also includes an interlayer 80 disposed between the inner and outer transparent sheets 60, 70. Preferably, the interlayer 80 bonds the inner and outer transparent sheets 60, 70 and allows the laminated glass panel 50 to retain glass panel pieces upon impact or breakage.

The interlayer 80 typically is substantially transparent to light and includes a polymer or thermoplastic resin, such as polyvinyl butyral (PVB). However, other suitable materials for implementing the interlayer 80 may be utilized. Similar to the inner and outer transparent sheets 60, 70, the interlayer 80 is also substantially transparent or otherwise transparent to light, and accordingly the glass panel 50 assembled to include the interlayer 80 between the inner and outer transparent sheets 60, 70 is also substantially transparent or otherwise transparent to light. The interlayer 80 includes a first side 82 and a second side 84 and an edge 86 defined between the first and second sides 82, 84.

When assembled, the first side 82 of the interlayer 80 bonds to the second side 64 of the inner transparent sheet 60, and a second side 84 of the interlayer 80 bonds to a first side 72 of the second transparent sheet 70 such that the interlayer 80 bonds to each of the inner and outer transparent sheets 60, 70 to form the laminated glass panel 50.

When assembled, the relative thickness of each of the edges 66, 76, 86 of the laminated glass panel 50 corresponds to the edge 36 of the glass panel 30. In addition, the first surface 62 and the second surface 74 correspond to the first side 32 and second side 34, respectively, of the glass panel 30.

Figure 5:
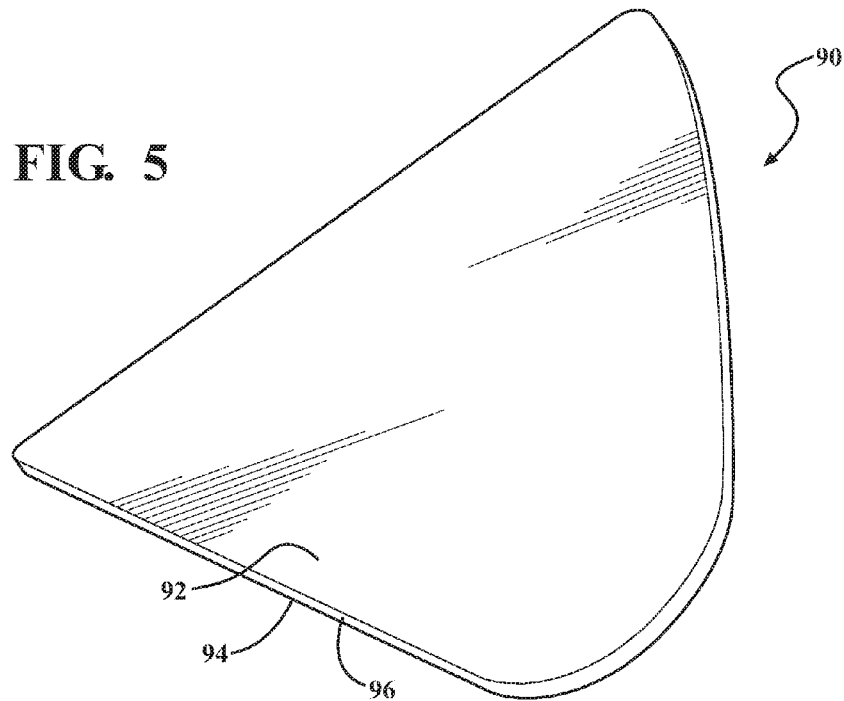
FIG. 5 is a perspective view of a tempered glass panel for use in the glass assembly of another embodiment of the present invention.

As noted above, in another embodiment, the glass panel 30 is a tempered glass panel 90. As opposed to a laminated glass panel 50, a tempered glass panel 90 is a single layer glass panel that has been processed by controlled thermal or chemical treatments to increase its strength compared to normal glass (i.e., untempered or annealed glass). Accordingly, the tempered glass panel 90, as shown in FIG. 5, includes a first side 92 (which corresponds to the first side 32), a second side 94 (which corresponds to the second side 34), and an edge 96 (which corresponds to the edge 36) defined between the first and second sides 92, 94.

Figure 6:
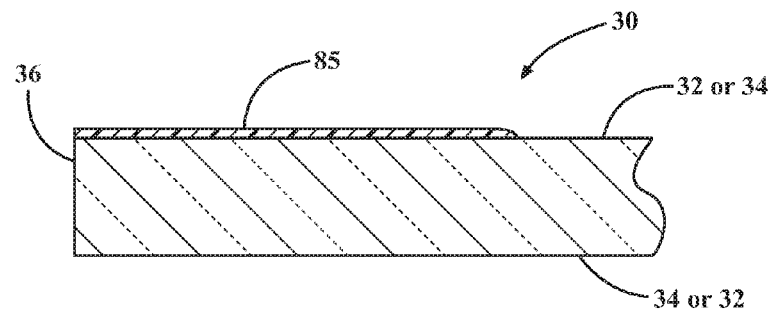
FIG. 6 is a side view of FIG. 2, 3 or 5 including a primer disposed on a portion of one side of the glass panel in accordance with another embodiment of the present invention.

In still further embodiments, such as illustrated in FIG. 6, the glass panel 30 of any of the embodiments described above may also include a primer 85 that is applied onto a portion of the first side 32, second side 34 and/or the edge 36 of the glass panel 30 (as shown in FIG. 7, the primer 85 is illustrated applied to a portion 31 of the first side 32 of the glass panel 30). The primer 85, as described in further detail below, may be applied to the glass panel 30 prior to its introduction within the plastic frame 100. Still further, as will also be described in further detail below, the primer 85 may be applied in conjunction with the application of the encapsulant 200 to the first side 32 and/or the second side 34 of the glass panel 30.

For ease in description hereinafter, the glass panel 30, 50, 90 of any of the above embodiments (including glass panels having a primer 85 as in FIG. 6), is hereinafter referred to as "the glass panel 30", which as noted above maybe be either in the form of a laminated glass panel 50 or a tempered glass panel 90. Accordingly, in each of the further Figures and descriptions, the description of any aspect of the glass panel 30 equally applies to the corresponding aspect of the laminated glass panel 50 or tempered glass panel 90. For example, a description of the first side 32 of the glass panel 30 also describes the first side 62 of the laminated glass panel 50 and to the first side 92 of the tempered glass panel 90.

In addition to the glass panel 30, the encapsulated glass assembly 25 also includes at least one clip 300 for coupling the glass panel 30 to the plastic frame 100.

Figure 7A:
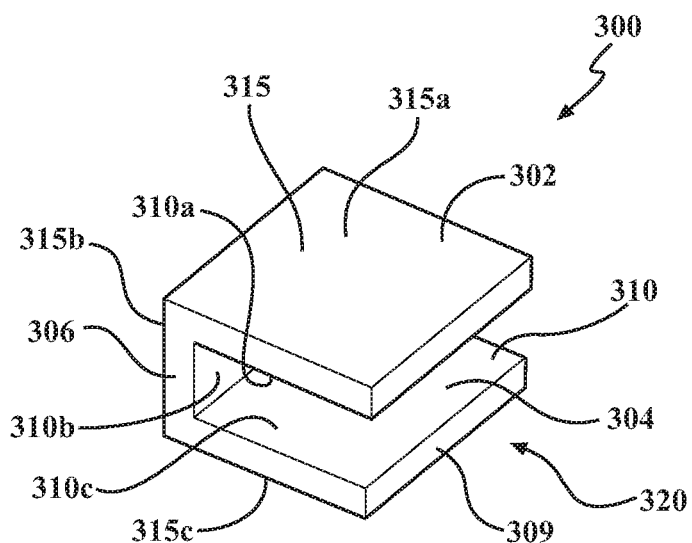
FIG. 7A is a perspective view of a clip for use in retaining the glass panel to the plastic frame in any of the embodiments of the present invention.
Figure 7B:
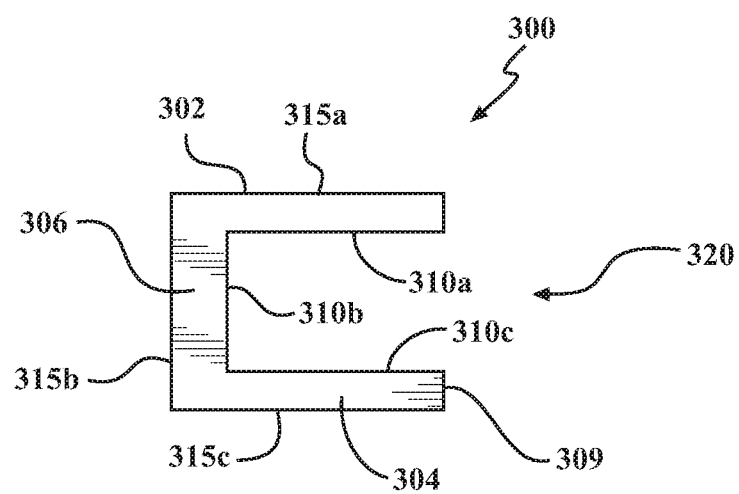
FIG. 7B is a side view of FIG. 7A.

As shown in FIGS. 7A and 7B, each one of the clips 300 (which alternatively below may refer to "a clip" and "an additional clip") has an upper clip portion 302 and the lower clip portion 304 and a middle clip portion 306 extending between and connecting the upper clip portion 302 to the lower clip portion 306. The clip 300 also includes an inner clip surface 310 and an outer clip surface 315 opposite the inner clip surface 310. The inner clip surface 310 and outer clip surface 315 may further be subdivided in the inner clip surfaces 310a, 310b, and 310c, and outer clip surfaces 315a, 315b, and 315c, of the respective upper clip portion 302, middle clip portion 306 and the lower clip portion 304. Still further, the inner clip surfaces 310a, 310b, and 310c of the respective upper clip portion 302, middle clip portion 306 and the lower clip portion 304 collectively define a C-shaped clip channel 320. The lower clip portion 304 also includes an end 309 located opposite the middle clip portion 306.

In addition to the glass panel 30 and at least one clip 300, the encapsulated glass assembly 25 also includes a frame (shown as 100 in FIGS. 1 and 8-40) coupled to the glass panel 30 (i.e., wherein the glass panel 30 is introduced into the plastic frame 100). As used herein, the term "introduced" can be used interchangeably with the term "installed" with respect to introducing/installing the glass panel 30 to the plastic frame 100.

The plastic frame 100 is preferably formed from a hard plastic material and includes an outer frame surface (shown as 106 in FIGS. 8-40 below). In certain embodiments, the plastic material used in forming the plastic frame 100 is a material that, when formed to its final shape, has a Shore D hardness exceeding 50, such as from 55 to 95, such as from 70 to 85. Shore Hardness as described in the present invention may be measured with a durometer using the procedure described in ASTM D2240. In certain embodiments, the hard plastic material is polypropylene or a thermoplastic polyolefin (TPO) that is molded to a desired shape to form the plastic frame 100. In embodiments wherein the hard plastic material is polypropylene, the Shore D hardness ranges from 55 to 95, such as from 70 to 85.

In certain embodiments, the plastic frame 100 is a one-piece structure that is formed to generally coincide to the shape of the glass panel 30 such that the glass panel 30 may be contained within the plastic frame 100 when the glass panel 30 is coupled to the plastic frame 100. Exemplary one-piece frames 100 are described in numerous embodiments below. As noted above the glass panel described with respect to these respective glass assemblies 25 is designated by reference numeral 30 and includes the afore-mentioned first and second sides 32, 34 and edge 36 unless otherwise indicated. Still further, the glass panel 30 described in these assemblies can be either the laminated glass panel 50 or tempered glass panel 90 unless otherwise expressly specified.

In general, the plastic frame 100 is formed in its final shape prior to coupling to glass panel 30 and clips 300, or otherwise provided in its final shape prior coupling to the glass panel 30 and clips 300, as described in further detail below.

For polypropylene frame plastic frames 100, the manufacturing (i.e., molding) may be performed in an injection mold having a cavity portion having the desired dimensions and the shape, such as the dimensions and shapes for any of the plastic frames 100 illustrated in any one of the FIGS. 8-40 as described herein. In certain embodiments, the plastic frame 100 is molded in an injection mold (not shown). Exemplary, non-limiting injection molds that may be used include injection molding equipment commercially available from Krauss-Maffei Corporation of Munich, Germany. Exemplary molding conditions for forming any of the plastic frames 100 using the injection molding equipment commercially available from Krauss-Maffei Corporation are as follows: mold temperatures ranging from about 110 to 140 degrees Fahrenheit (about 43 to 60 degrees Celsius); injection pressures ranging from about 6600 to 7250 pounds per square inch (about 4.62 to 5.20 MPa (MegaPascals)); barrel temperatures ranging from 400 to 450 degrees Fahrenheit (about 204 to 232 degrees Celsius); and fill times ranging from 1.9 to 2 seconds.

In various embodiments described below, the plastic frame 100 includes features on one or more of the respective frame sides 111 that, in conjunction with the clips 300 described above and below, function to retain the glass panel 30 in its desired position on the plastic frame 100 prior to the application of the encapsulant 200 to the glass panel 30, plastic frame 100, and clips 300 to secure the glass panel 30 to the plastic frame 100.

In each of the respective embodiments described herein, the plastic frame 100 in accordance with each exemplary embodiment of the present invention has an outer frame surface 106 that includes an upper surface 107 and a lower surface 108. An inner surface 109 and an outer surface 110, respectively, connect the upper surface 107 to the lower surface 108. The terms upper and lower, as described herein with respect to any component, are not meant to imply a relative orientation of such component with respect to the earth. Accordingly, the upper surface 107 of the plastic frame 100 may be positioned closer, or further from, the earth relative to the lower surface 108 of the plastic frame 100 during use and should not be therefore considered limiting.

As noted above, the plastic frame 100 is generally shaped to coincide to the shape of the glass panel 30 such that such that the glass panel 30 is at least partially contained within the plastic frame 100. In embodiments wherein the glass panel 30 is formed having three or more outer side regions 38 defined along the edge 36 and including outer edge corners 40 disposed between each adjacent pair of outer side regions 38, the plastic frame 100 is preferably shaped to correspond to at least two of the adjacent outer side regions 38 and to the edge corner 40 defined between a respective pair of the two adjacent outer side regions 38. Accordingly, the plastic frame 100 thus includes at least three frame sides 111, with each pair of adjacent frame sides 111 having a corner 112 defined as the transition between the adjacent frame sides 111.

In each respective embodiment, each of the frame sides 111 of the plastic frame 100 include a lower wall portion 117 extending within the outer frame surface 106. The lower wall portion 117 includes an inner surface 123 and the opposing lower surface 108 and the inner and outer surfaces 109, 110, respectively, as described above.

While each embodiment of the respective plastic frame includes these features, the plastic frames 100 of alternative exemplary embodiments may include further features along one or more of the respective frame sides 111 that work in conjunction with the at least one clip 300 to aid in retaining the glass panel 30 to the plastic frame 100 prior to application of the encapsulation.

Thus, in certain embodiments, the plastic frame 100 is flat along each respective frame side 111 of the plastic frame 100 (and thus includes only the lower wall portion 118), and a respective clip 300 having the C-shaped clip channel 320 is introduced onto a first frame side 111A and onto a second frame side 111B after the coupling of the glass panel 30 to the plastic frame 100 to retain a portion of the glass panel 30 within the C-shaped clip channel 320 prior to the application of the encapsulant 200.

Alternatively, and in certain other embodiments described below, the second frame side 111B includes a C-shaped channel 135 that receives another portion of the glass panel 30. In these embodiments, the C-shaped channel 135 replaces the additional clip 300 on the second frame side 111B to retain another portion of the glass panel 30 within the C-shaped clip channel 320 prior to the application of the encapsulant 200.

In still further alternative embodiments as also described below, the plastic frame 100 includes an L-shaped channel 136 along one, two or each respective frame side 111, including at least the first frame side 111A to which a clip 300 is coupled, that aids in retaining the glass panel 30 in the proper position on the plastic frame 100 prior to application of the encapsulant 200

In yet still further embodiments, and also described below, an inlet region 160 extends within the lower wall portion 117 and within the side wall portion 118 (when present) on at least the first frame side 111A of the plastic frame 100 into which the clip 300.

Even still further, in certain embodiments, the lower wall portion 117 includes a recessed region 170 that receives the lower clip portion 304 of the clip 300 and functions to aid in retaining the clip 300 in its proper position prior to the application of the encapsulant 200.

Referring first to FIGS. 8-13, one exemplary embodiment of the plastic frame 100 of the present invention includes wherein each of the frame sides 111 has the lower wall portion 117 extending within the outer frame surface 106, but does not include any additional features.

Figure 9:
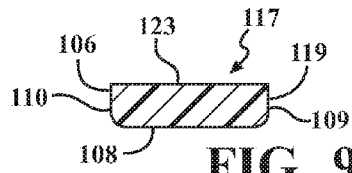
FIG. 9 is a section view of FIG. 8 taken along line 9-9.

As best shown in FIG. 9, the lower wall portion 117 includes the inner surface 123, the lower surface 108, the outer surface 110 and the inner surface 109. The inner surface 109 also defines the edge portion 119.

Figure 10:
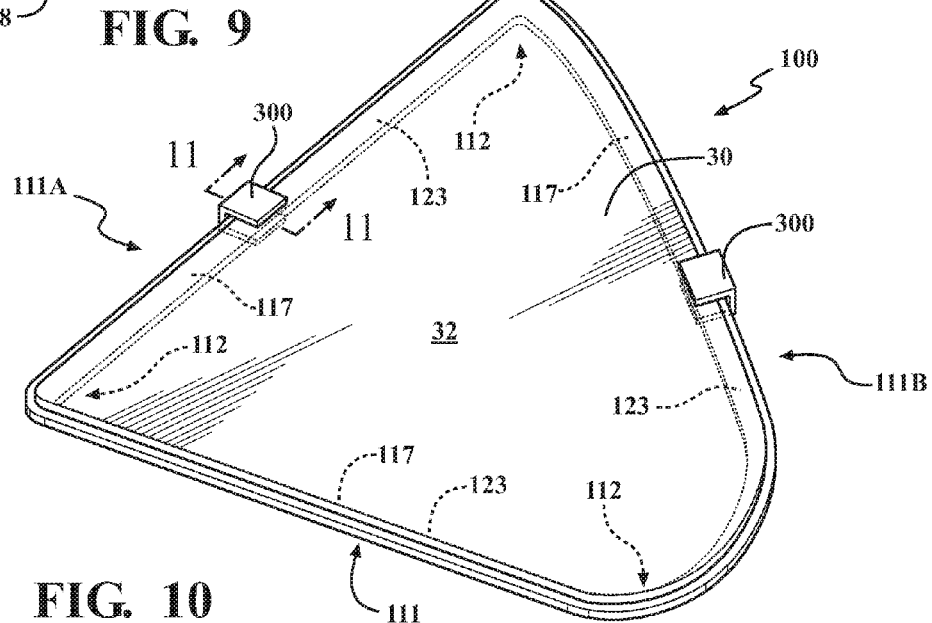
FIG. 10 is a perspective view of a glass panel coupled to the plastic frame of FIG. 8 and including a pair of coupled clips prior to encapsulation in accordance with one embodiment of the present invention.

In this embodiment, to couple the glass panel 30 to the plastic frame 100, as illustrated in FIG. 10, the glass panel 30 is first placed onto the plastic frame 100 such that each one of the sides 38 of the glass panel 30 are aligned with a corresponding one frame side 111 of the plastic frame 100 and wherein the corners 40 of the glass panel 30 are aligned with a corresponding corner 112 of the plastic frame 100. In this position, a portion of the second side 34 of the glass panel 30 is adjacent to the inner surface 123 of the lower wall portion 117 of each respective frame side 111 of the plastic frame 100. In addition, the edge 36 of the glass panel 30 is coplanar with the outer surface 110 of the lower wall portion 117 of the plastic frame 100.

Figure 11:
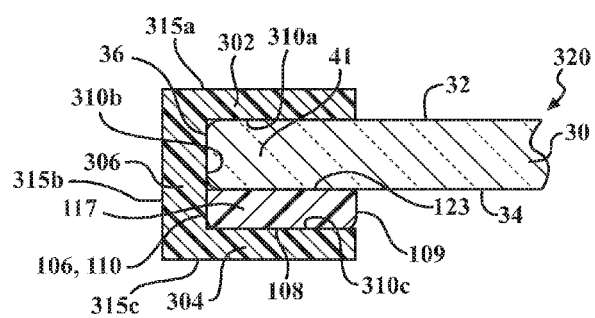
FIG. 11 is a section view of FIG. 10 and FIG. 37 taken along line 11-11.

Next, as also illustrated in FIG. 10 and in FIG. 11, a clip 300 is coupled onto a first frame side 111A of the plastic frame 100, and an optional additional clip 300 is coupled onto a second frame side 111B of the plastic frame 100, such that the portion 41 of the glass panel 30 is contained within a respective C-shaped clip channel 320 of the clip 300 and the additional clip 300. In this position, as best shown in FIG. 11 with respect to one of the clips 300 (here the one clip 300 coupled onto the first frame side 111A), a portion of the edge 36 of the glass panel 30 is adjacent to the inner clip surface 310b of the middle clip portion 306, while a portion of the first side 32 of the glass panel 30 is adjacent to the inner surface 310a of the upper clip portion 302, while a portion of the second side 34 of the glass panel 30 is also contained within the C-shaped clip channel 320. In addition, in this position, the inner clip surface 310c of the lower clip portion 304 is positioned adjacent to the lower surface 308.

While this embodiment illustrates an optional additional clip 300 coupled onto a second frame side 111B, in certain embodiments (not shown) the additional clip 300 is not included on the second frame side 111B, whereas in other embodiments (such as shown) the additional clip 300 is included. For ease of description hereinafter with respect to this embodiment and in further embodiments describing the additional clip 300, this additional clip 300 is described as being coupled on the plastic frame 100 as described below.

Figure 12:
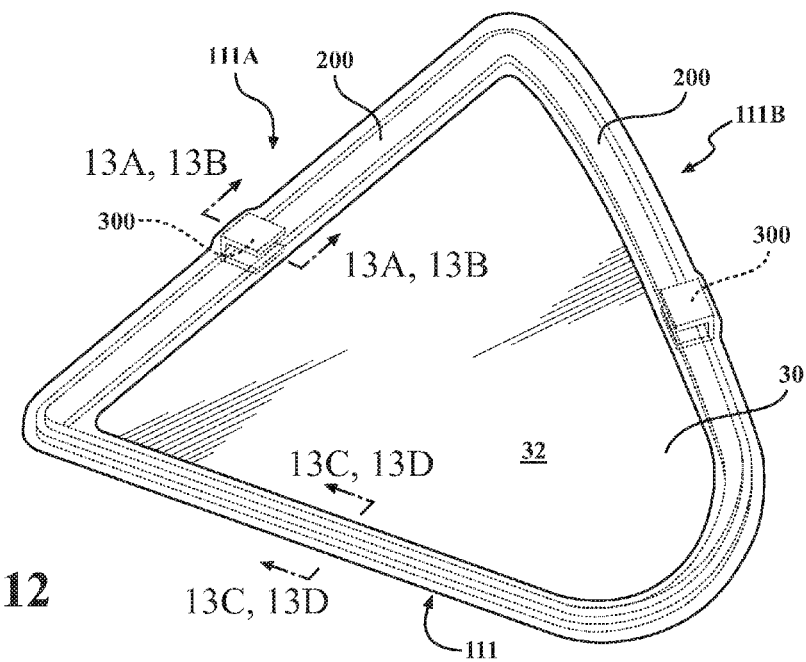
FIG. 12 is a perspective view of an encapsulated glass frame assembly including the plastic frame and clips of FIG. 8.
Figure 13A:
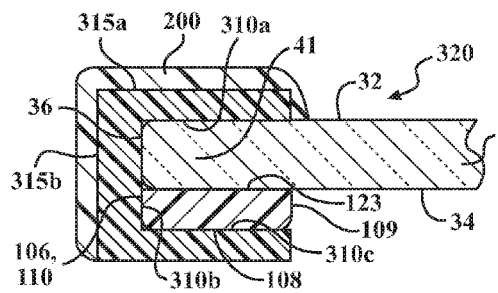
FIG. 13A is a section view of FIG. 12 and FIG. 39 taken along line 13A-13A and including a two-sided encapsulant.
Figure 13B:
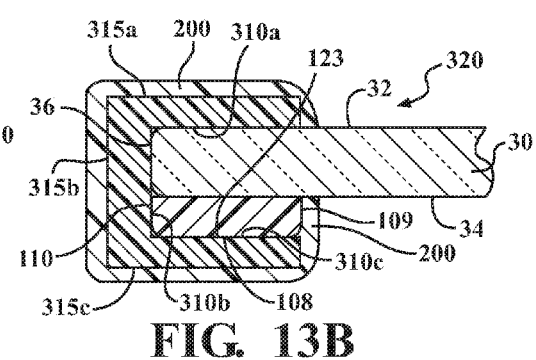
FIG. 13B is a section view of FIG. 12 and FIG. 39 taken along line 13B-13B and including a three-sided encapsulant.
Figure 13C:
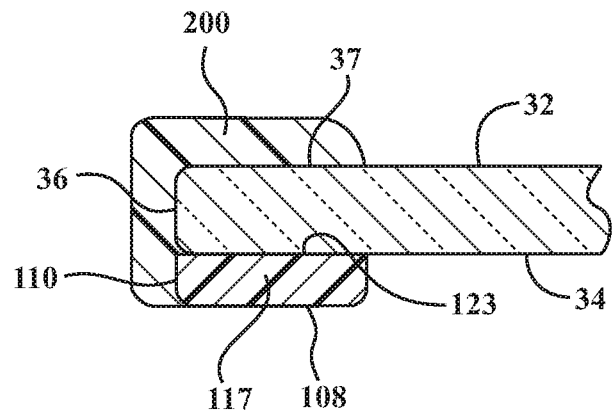
FIG. 13C is a section view of FIG. 12 and FIG. 39 taken along line 13C-13C and including a two-sided encapsulant.
Figure 13D:
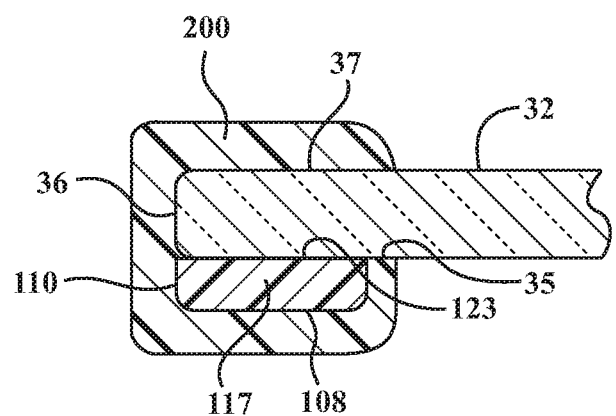
FIG. 13D is a section view of FIG. 12 and FIG. 39 taken along line 13D-13D and including a three-sided encapsulant.

After the glass panel 30 is coupled to the plastic frame 100 and the clip 300 is coupled over the plastic frame 100 and glass panel 30, as illustrated in FIG. 12, an encapsulant 200 is applied onto each of the sides 111, 111A, 111B of the plastic frame 100, onto each of the coupled clips 300, and onto at least one of the first side 32 and second side 34 of the glass panel 30 to secure the glass panel 30 to the plastic frame 100. The encapsulant 200 can be a two-sided encapsulant 200 (as shown in FIGS. 13A and 13C) or a three-sided encapsulant (as shown in FIG. 13B or 13D), as described further below.

In an alternative embodiment, such as shown in FIGS. 14-19, a channel 115 extends within the inner surface 109 and within the upper surface 107 of one or more of the frame sides 111 of the plastic frame 100. The channel 115 is generally defined as an L-shaped channel 136, as best shown in FIG. 15, having a lower wall portion 117 extending from a side wall portion 118. The lower wall portion 117 terminates at an edge portion 119 remote from the side wall portion 118. The side wall portion 118 terminates into the upper surface 107 opposite from the lower wall portion 117.

In this alternative embodiment, to couple the glass panel 30 to the plastic frame 100, as illustrated in FIG. 16, the glass panel 30 is first placed onto the plastic frame 100 such that each one of the sides 38 of the glass panel 30 are aligned with a corresponding one frame side 111 of the plastic frame 100 and wherein the corners 40 of the glass panel 30 are aligned with a corresponding corner 112 of the plastic frame 100. In this position, a portion of the second side 34 of the glass panel 30 is adjacent to the inner surface 123 of the lower wall portion 117 of each respective frame side 111 of the plastic frame 100. In addition, the edge 36 of the glass panel 30 is adjacent to the inner surface 109 of the side wall portion 118 along each respective frame side 111.

Next, as also illustrated in FIG. 16 and in FIG. 17, a clip 300 is coupled onto a first frame side 111A of the plastic frame 100, and an additional clip 300 is coupled onto a second frame side 111B of the plastic frame 100, such that the portion 41 of the glass panel 30 is contained within a respective C-shaped clip channel 320 of the clip 300 or additional clip 300. In this position, as best shown in FIG. 17 with respect to one of the clips 300 (here the one coupled onto the first frame side 111A), a portion of the edge 36 of the glass panel 30 is adjacent to the inner clip surface 310b of the middle clip portion 306, while a portion of the first side 32 of the glass panel 30 is adjacent to the inner surface 310a of the upper clip portion 302, while the portion of the second side 34 of the glass panel 30 contained within the C-shaped clip channel 320. In addition, in this position, the inner clip surface 310c of the lower clip portion 304 is positioned adjacent to the lower surface 308.

Figure 19D:
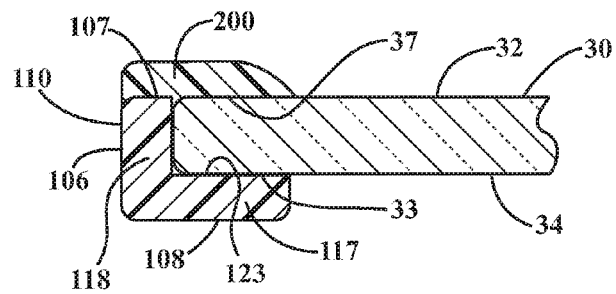
FIG. 19D is a section view of FIG. 18 taken along line 19D-19D and including a one-sided encapsulant.

After the glass panel 30 is coupled to the plastic frame 100 and the clip is 300 coupled over the plastic frame 100 and glass panel 30, as illustrated in FIG. 18, an encapsulant 200 is applied onto each of the sides 111, 111A, 111B of the plastic frame 100, onto each of the coupled clips 300, and onto at least one of the first side 32 and second side 34 of the glass panel 30 to secure the glass panel 30 to the plastic frame 100. The encapsulant 200 can be a one-sided encapsulant (as shown in FIG. 19A with respect to the frame side 111A or 111B including the clip 300 and FIG. 19D with respect to the frame side 111 including the L-shaped channel 136), a two-sided encapsulant 200 (as shown in FIG. 19B with respect to the frame side 111A or 111B including the clip 300 and FIG. 19E with respect to the frame side 111 including the L-shaped channel 136), or a three-sided encapsulant (as shown in FIG. 19C with respect to the frame side 111A or 111B including the clip 300 and FIG. 19F with respect to the frame side 111 including the L-shaped channel 136), as described further below.

Figure 8:
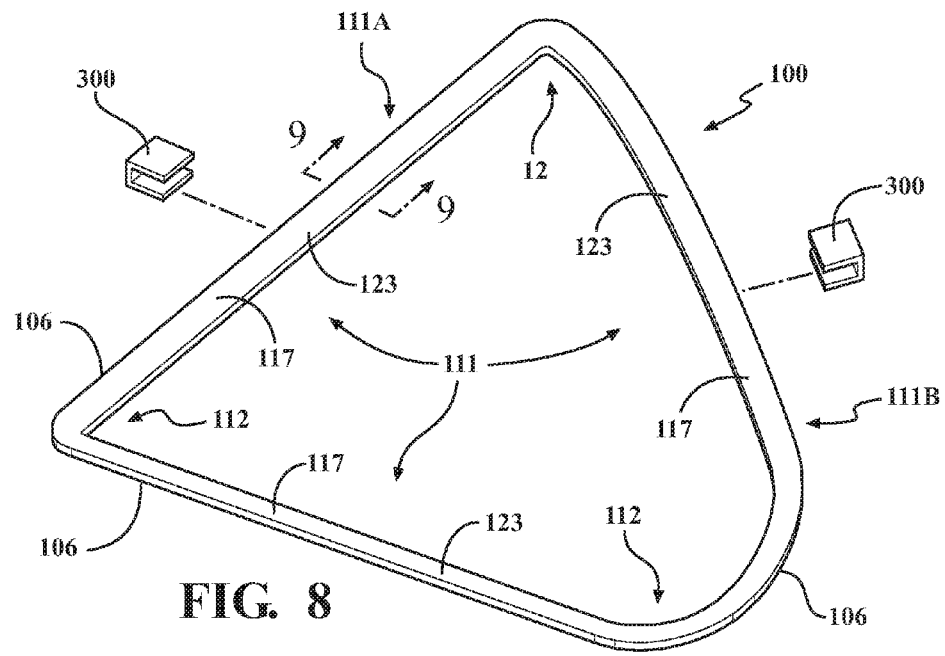
FIG. 8 is a perspective view of a plastic frame and a pair of clips for use in the encapsulated glass assembly in accordance with one embodiment of the present invention.
Figure 20:
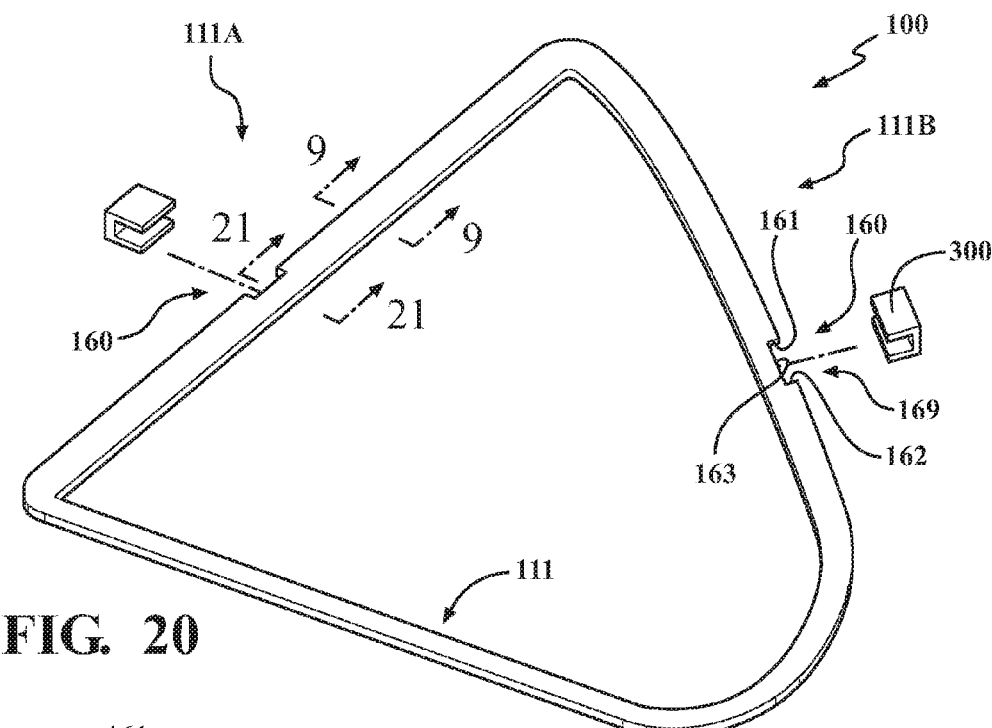
FIG. 20 is a perspective view of a plastic frame and a pair of clips for use in the encapsulated glass assembly in accordance with yet another embodiment of the present invention.
Figure 21:
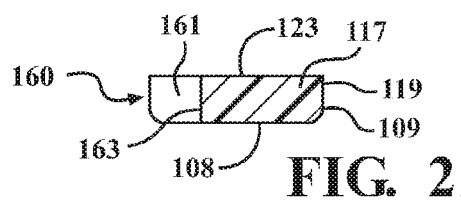
FIG. 21 is a section view of FIG. 20 taken along line 21-21.

In another alternative version of the plastic frame 100 of FIG. 8, as illustrated in FIGS. 20-25, the first frame side 111A of the plastic frame 100, and optionally the second frame side 111B of the plastic frame 100, also includes an inlet region 160 extending with a portion of the lower wall portion 117 between the respective corners 112 that corresponds to the placement of the clips 300. As also shown in FIG. 21, the inlet region 160 is defined by a pair of opposing parallel side regions 161, 162 extending from the inner surface 123 to the lower surface 108 of the lower wall portion 117 and terminating at an end region 163 of the lower wall portion 117 that extends between the side regions 161, 162. Accordingly, the inlet region 160 further defines an opening 169 between the respective side regions 161, 162 and end region 163.

Figure 22:
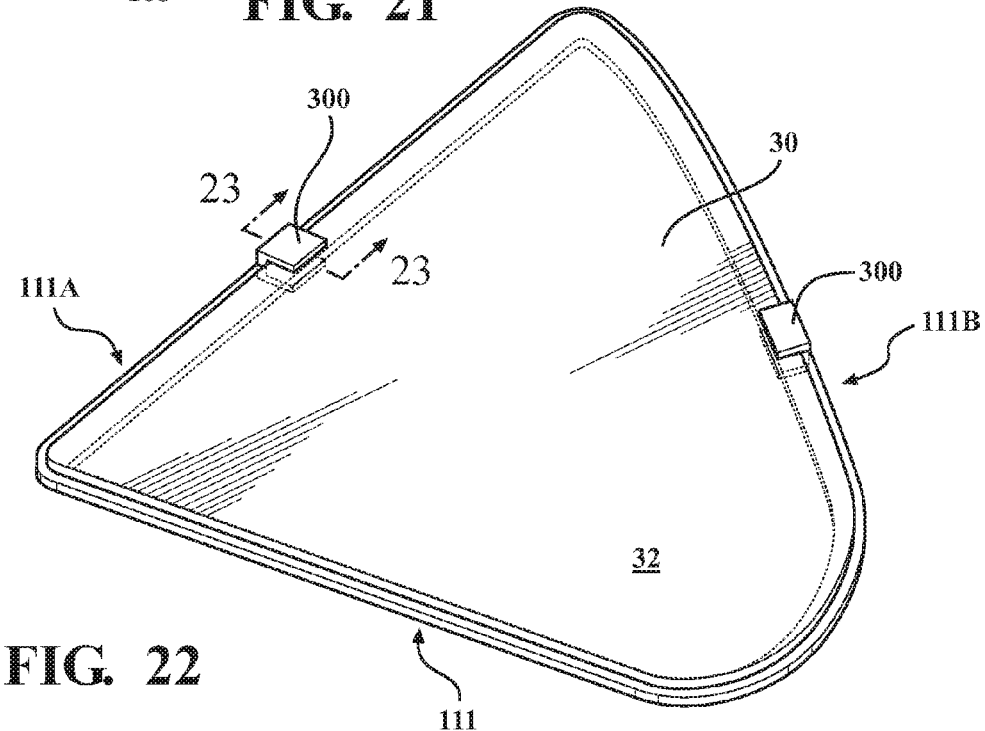
FIG. 22 is a perspective view of a glass panel coupled to the plastic frame of FIG. 20 and including a pair of coupled clips prior to encapsulation in accordance with one embodiment of the present invention.
Figure 23:
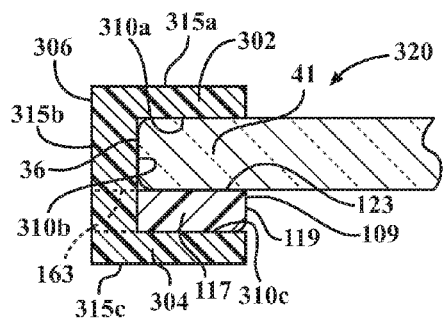
FIG. 23 is a section view of FIG. 22 taken along line 23-23.

Next, as also illustrated in FIG. 22 and in FIG. 23, a clip 300 is coupled within the opening 169 of the inlet region 160 on and onto a first frame side 111A of the plastic frame 100, and an additional clip 300 is coupled within the opening 169 of the additional inlet region 160 and onto a second frame side 111B of the plastic frame 100, such that the portion 41 of the glass panel 30 is contained within a respective C-shaped clip channel 320 of the clip 300 or additional clip 300. In this position, as best shown in FIG. 23 with respect to one of the clips 300 (here the one clip 300 coupled onto the first frame side 111A), a portion of the edge 36 of the glass panel 30 is adjacent to the inner clip surface 310b of the middle clip portion 306, while another portion of the inner clip surface 310b is adjacent to the end region 163 of the inlet region 160. In addition, the inner clip surface 310a of the upper clip portion 302 is adjacent to the first side 32 of the glass panel 30, while the second side 34 is adjacent to the inner surface 123 of the lower wall portion 117. Still further, the inner clip surface 310c of the lower clip portion 304 is positioned adjacent to the lower surface 108 of the lower wall portion 117.

In certain embodiments (not shown), the outer clip surface 315b of the middle clip portion 306 is coplanar with the outer surface 110 of the lower wall portion 117. In still further embodiments (also not shown), the end 109 of the lower clip portion 304 is abutted against the end region 163 of the inlet region 160. In related embodiments, the lower clip surface 315c of the lower clip portion 304 can be coplanar with the lower surface 108 of the lower wall portion 117 when the end 109 of the lower clip portion 304 is abutted against the end region 163 of the inlet region 160.

Figure 24:
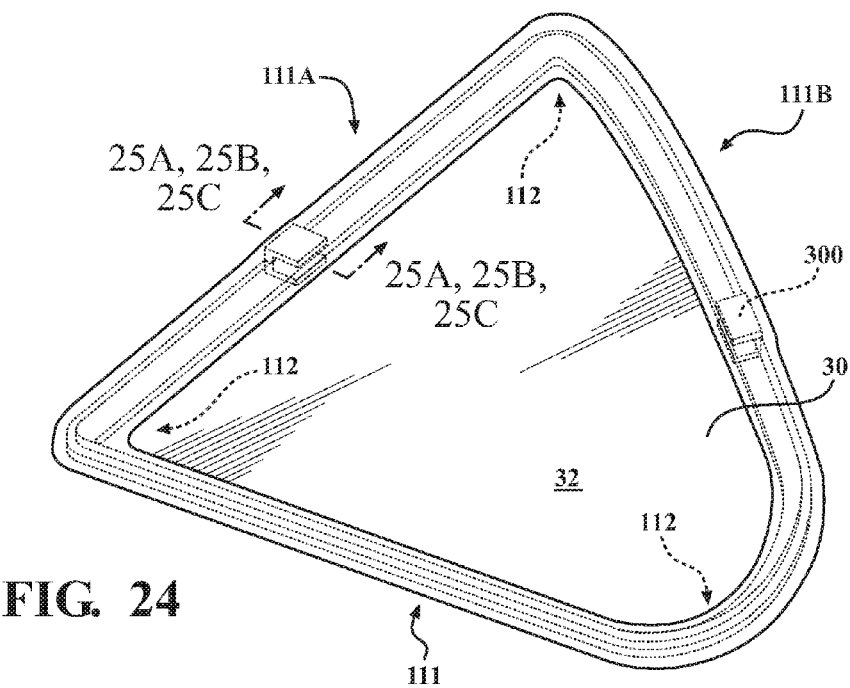
FIG. 24 is a perspective view of an encapsulated glass frame assembly including the plastic frame and clips of FIG. 20.
Figure 25A:
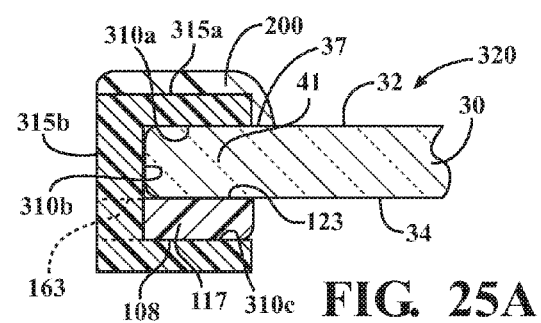
FIG. 25A is a section view of FIG. 24 taken along line 25A-25A and including a one-sided encapsulant.
Figure 25B:
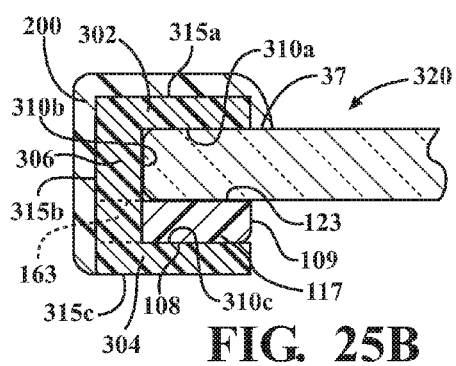
FIG. 25B is a section view of FIG. 24 taken along line 25B-25B and including a two-sided encapsulant.
Figure 25C:
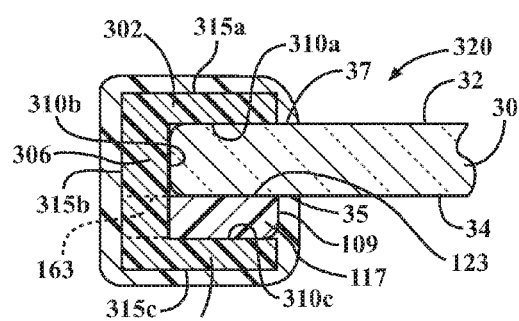
FIG. 25C is a section view of FIG. 24 taken along line 25C-25C and including a three-sided encapsulant.

After the glass panel 30 is coupled to the plastic frame 100 and the clip 300 is inserted within the inlet region 160, as illustrated in FIG. 24, an encapsulant 200 is applied onto each of the sides 111, 111A, 111B of the plastic frame 100, onto each of the coupled clips 300, and onto at least one of the first side 32 and second side 34 of the glass panel 30 to secure the glass panel 30 to the plastic frame 100. The encapsulant 200 can be a one-sided encapsulant (as shown in FIG. 25A), a two-sided encapsulant 200 (as shown in FIG. 25B), or a three-sided encapsulant (as shown in FIG. 25C), as described further below.

In a related embodiment to the plastic frame of FIG. 20, in conjunction with the inlet region 160 and as illustrated in FIGS. 26-32, the lower wall portion 117 also includes a recessed region 170 extending inwardly from the end region 163 of the inlet region 160 in a direction away from the side wall portion 118.

The recessed region 170 receives the lower clip portion 304 of the clip 300 when the clip 300 is coupled to the plastic frame 100. More specifically, as shown best in FIGS. 28 and 29, the recessed region 170 is recessed within the lower surface 107 of the lower wall portion 117 and includes a pair of recessed side regions 171, 172, and optionally can include a recessed end region 173 extending between the pair of side regions 171, 172. The recessed region 170 thus forms a base region 175 that is generally flat and is recessed at a depth d relative to a plane defined along the lower surface 108 of lower wall portion 117. Accordingly, when the clip 300 is coupled to the plastic frame 100, the lower clip portion 304 of the clip 300 is received within the recessed region 170 such that its inner surface 310c is adjacent to the flat base region 175.

Preferably, the spacing between the pair of recessed side regions 171, 172 is slightly larger than the width of the lower clip portion 304, and the depth d of base region 175 is the same as the thickness of the lower clip portion 304 measured from the inner clip surface 310c to the outer clip surface 315c. Accordingly, when the lower clip portion 304 is received within the recessed region 170, the outer clip surface 315c of the lower clip portion 304 is coplanar with the lower surface 108 of the lower wall portion 117 of the plastic frame 100.

Figure 31:
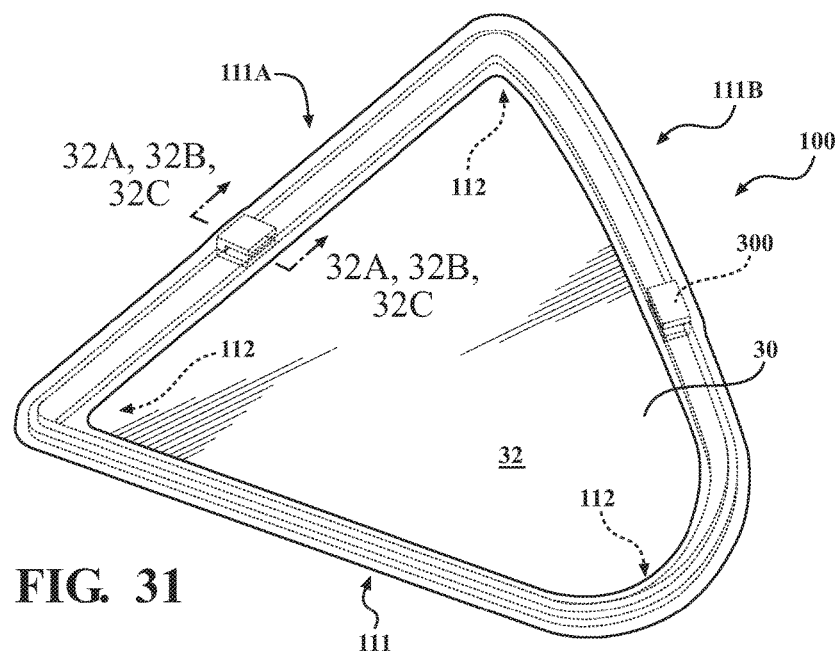
FIG. 31 is a perspective view of an encapsulated glass frame assembly including the plastic frame and clips of FIG. 28.
Figure 30:
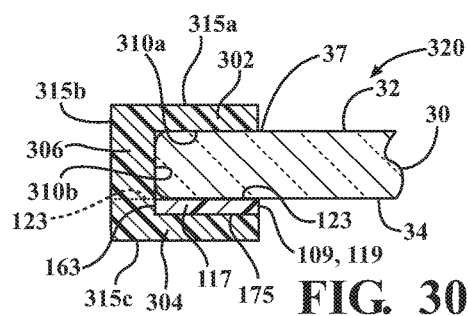
FIG. 30 is a section view of FIG. 28 taken along line 30-30.
Figure 32A:
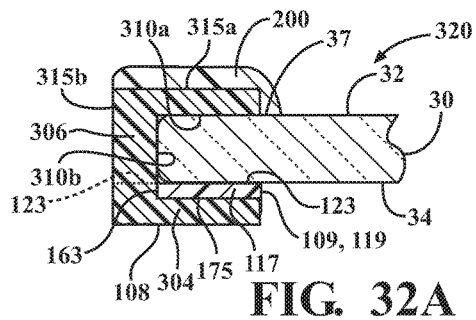
FIG. 32A is a section view of FIG. 31 taken along line 32A-32A and including a one-sided encapsulant.
Figure 32B:
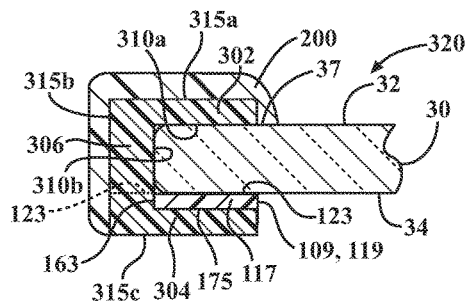
FIG. 32B is a section view of FIG. 31 taken along line 32B-32B and including a two-sided encapsulant.
Figure 32C:
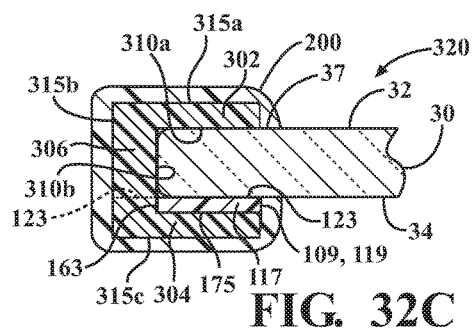
FIG. 32C is a section view of FIG. 31 taken along line 32C-32C and including a three-sided encapsulant.

After the glass panel 30 is coupled to the plastic frame 100 and the clip 300 is inserted within the inlet region 160 and onto the recessed region 170, as illustrated in FIG. 28 and in FIG. 30A, an encapsulant 200 is applied onto each of the sides 111, 111A, 111B of the plastic frame 100, onto each of the coupled clips 300, and onto at least one of the first side 32 and second side 34 of the glass panel 30 to secure the glass panel 30 to the plastic frame 100, as illustrated in FIG. 31. The encapsulant 200 can be a one-sided encapsulant (as shown in FIG. 32A), a two-sided encapsulant 200 (as shown in FIG. 32B), or a three-sided encapsulant (as shown in FIG. 32C), as described further below.

Figure 33:
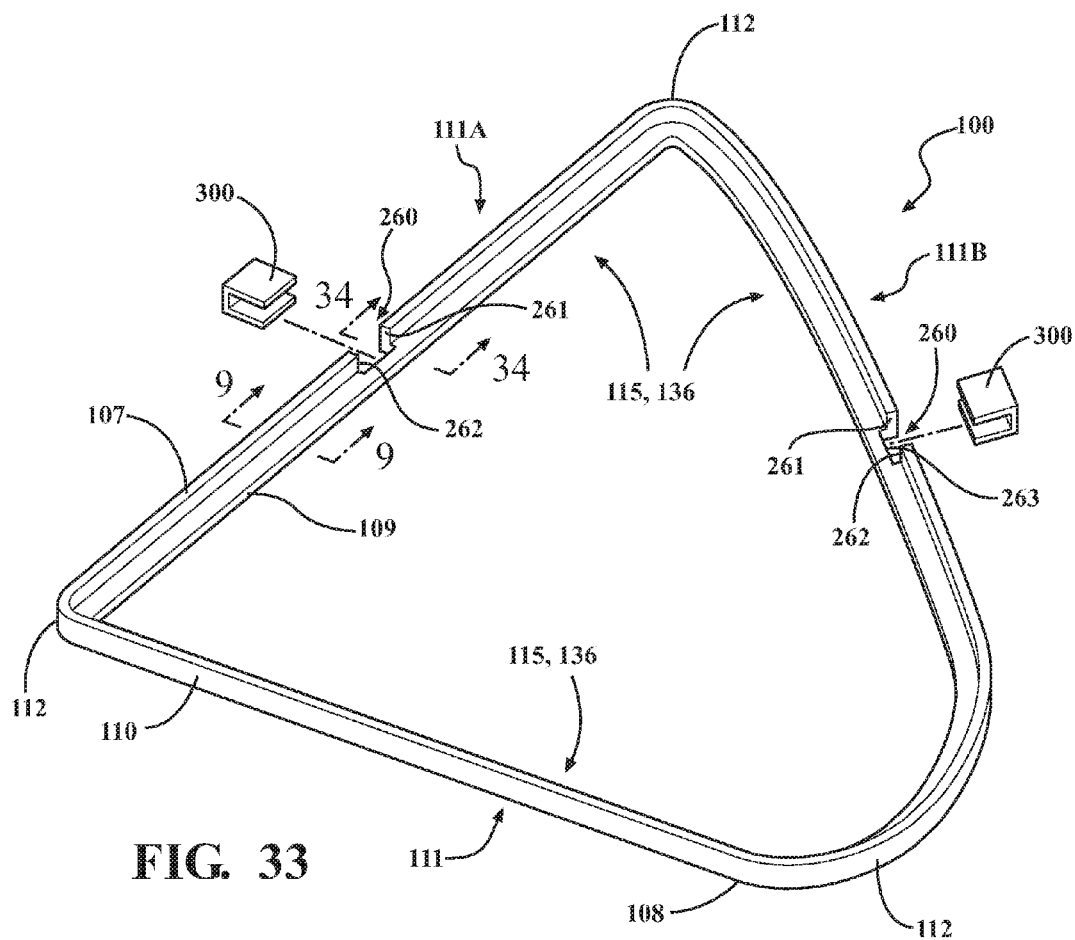
FIG. 33 is a perspective view of a plastic frame and a pair of clips for use in the encapsulated glass assembly in accordance with still an additional embodiment of the present invention.
Figure 34:
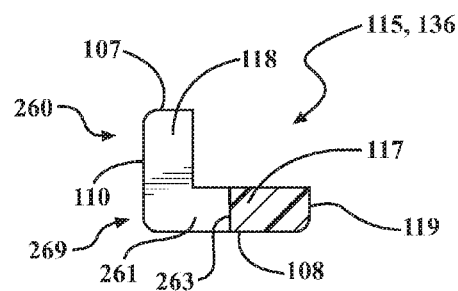
FIG. 34 is a section view of FIG. 33 taken along line 34-34.

In still further embodiments that include the L-shaped channels 136 on the first frame side 111A, in an alternative embodiment as shown in FIGS. 33 and 34, the first frame side 111A of the plastic frame 111 also includes an inlet region 260 extending into the side wall portion 118 and extending into a portion of the lower wall portion 117 between the respective corners 112. The inlet region 260, which is similar to the inlet region 160 as described above in FIG. 20, is defined by a pair of opposing parallel side regions 261, 262 extending from the upper surface 107 of the side wall portion 118 and within a portion of the lower wall portion 117. The inlet region 260 may further include an end region 263 that extends between the side regions 261, 262. Accordingly, the inlet region 260 further defines an opening 269 between the respective side regions 261, 262 and optional end region 263. The clip 300 can be coupled within the inlet region 260 in the same manner as described above with respect to inlet region 160 in FIG. 20-25.

In certain embodiments, in conjunction with the inlet region 260 located within the L-shaped channel 136, the lower wall portion 117 also includes a recessed region (not shown) similar to recessed region 170 described in the plastic frame 100 of FIG. 26 above. In this embodiment, the recessed region 170 extends inwardly from the end region 263 of the inlet region 260 in a direction away from the side wall portion 118. In this embodiment, the inner clip surface 310c of the lower clip portion 304 corresponding to the end 309 is positioned adjacent to the base region of the recessed region, while the remainder of the inner clip surface 310c nearer to the middle clip portion 306 is positioned adjacent to the second side 34 of the glass panel 30 within the opening, in a manner similar to the coupling of the clip 300 within the recessed region 170 as described with respect to FIG. 26 above.

In still further embodiments, as shown in FIGS. 35-40, a first frame side 111A of the plastic frame 100 includes either the lower wall portion 117 alone or includes an L-shaped channel 136 (shown in FIG. 35 as a lower wall portion 117) in combination with a clip 300, while a second frame side 111B of the plastic frame 100 includes at least one upper wall portion 116 connected to a side wall portion 118 (which is connected to the lower wall portion 107), with each one of the at least one upper wall portions 116 extending from a respective upper length 107 of the side wall portion 118. In these embodiments, an inner surface 121 of the upper wall portion 116, an inner surface 123 of the lower wall portion 117, and the inner surface 109 of the side wall portion 1118 define as a C-shaped channel 135.

In one embodiment in which the second frame side 111B of the plastic frame 100 has exactly one C-shaped channel 135 on the second frame side 111B, such as also shown in FIG. 36, the upper wall portion 116 may cover the entire upper length of the side wall portion 118 along the second frame side 111B of the plastic frame 100 (i.e., wherein the upper wall portion 116 extends from the side wall portion 118 on the second frame side 111B along its entire length from one corner 112 to the other corner 112). Accordingly, the entirety of the respective frame side 111B between the corners 112 can define the single C-shaped channel 135. Still further, a clip 300 is coupled onto a second frame side 111B of the plastic frame 100 in the same manner as the clip 300 coupled to the first and second frame side 111A, 111B as shown above in FIGS. 10 and 11.

Figure 35:
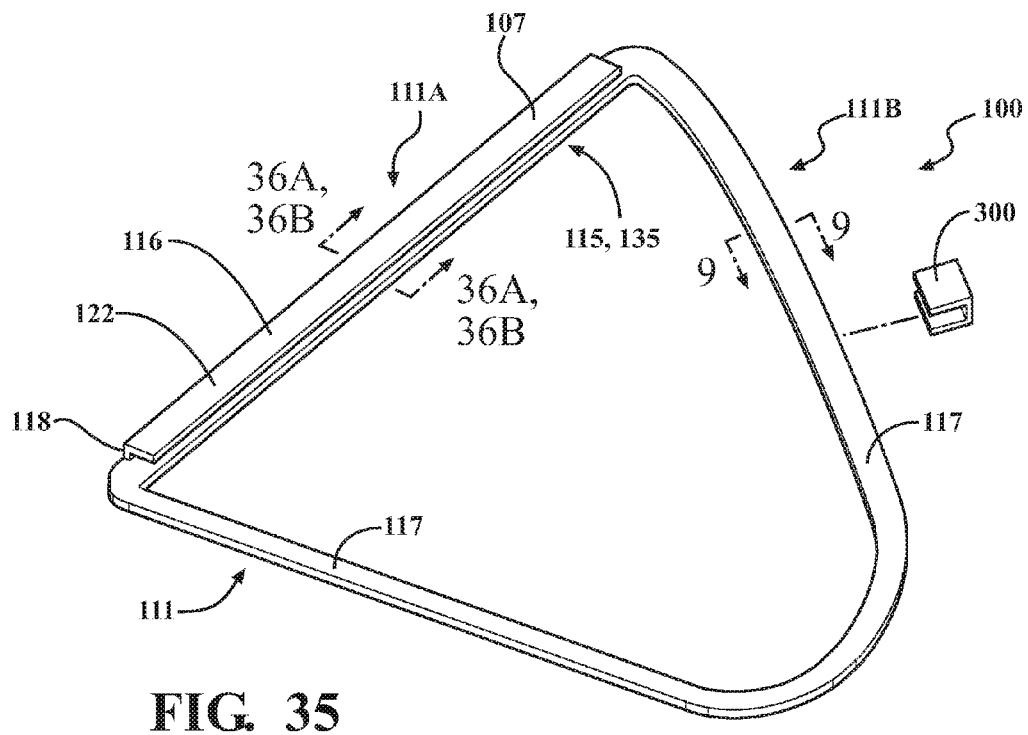
FIG. 35 is a perspective view of a plastic frame and a clip for use in the encapsulated glass assembly in accordance with still another embodiment of the present invention.
Figure 37:
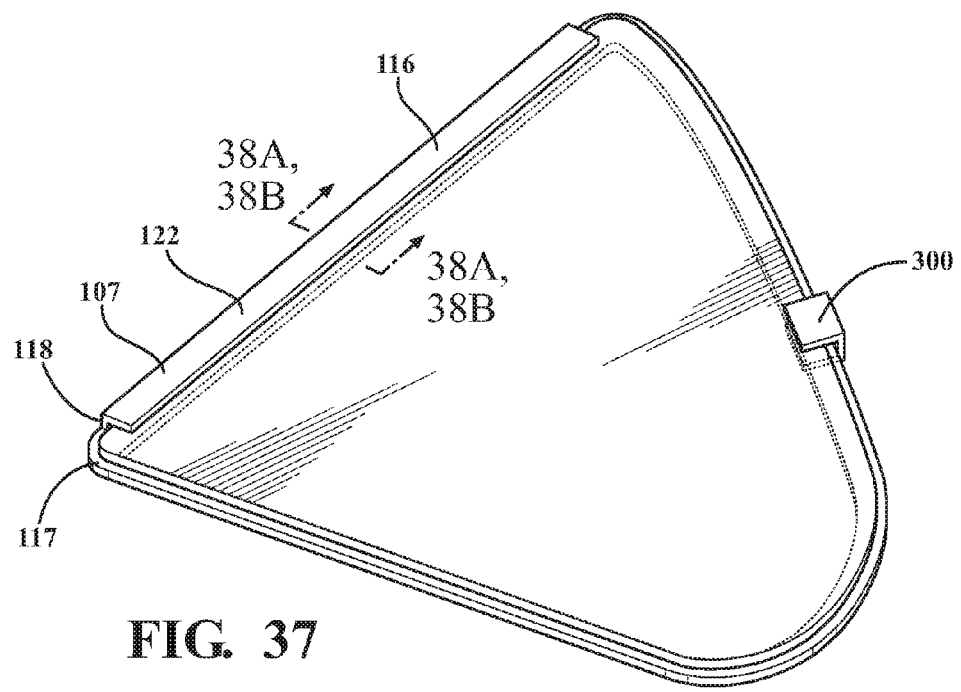
FIG. 37 is a perspective view of a glass panel coupled to the plastic frame of FIG. 35 and including a coupled clip prior to encapsulation.

To couple the glass panel 30 to the plastic frame 100 of the embodiment of FIG. 35, as illustrated in FIG. 37, a first side 38 of the glass panel 30 is inserted within the C-shaped channel 135 on the corresponding second frame side 111B of the plastic frame 100 such that each one of the remaining sides 38 of the glass panel 30 are aligned with a corresponding one frame side 111, 111A of the plastic frame 100 and wherein the corners 40 of the glass panel 30 are aligned with a corresponding corner 112 of the plastic frame 100. In this position, a portion of the second side 34 of the glass panel 30 is adjacent to the inner surface 123 of the lower wall portion 117 of each respective frame side 111, 111A, 111B of the plastic frame 100. In addition, the edge 36 of the glass panel 30 is adjacent to the inner surface 109 of the side wall portion 118 (when present) along each respective frame side 111, 111A, 111B not including the C-shaped channel 135.

Next, as also illustrated in FIG. 37, a clip 300 is coupled onto a first frame side 111A of the plastic frame 100 such that the portion 41 of the glass panel 30 is contained within a respective C-shaped clip channel 320 of the clip 300. The method for coupling the clip 300 to a frame side 111 including only the lower wall portion 117 is described above with respect to FIG. 10, while the method for coupling the clip 300 to a frame side 111 including an L-shaped channel is described above with respect to FIG. 16.

Figure 36A:
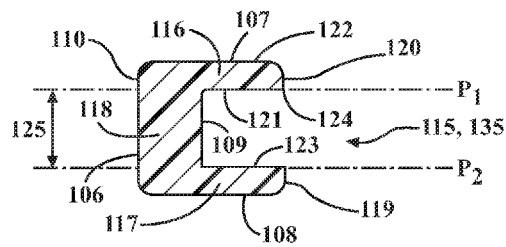
FIG. 36A is a section view of FIG. 35 taken along line 36A-36B.
Figure 36B:
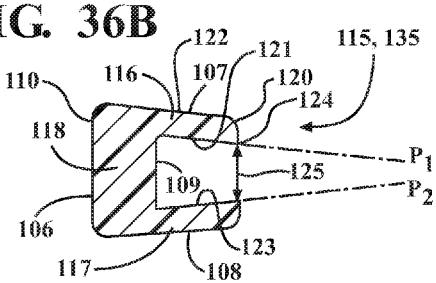
FIG. 36B is a section view of FIG. 35 taken along line 36B-36B illustrating a modified version of the C-shaped channel of FIG. 35.

As noted briefly above, each respective C-shaped channel 135 of the plastic frame 100, in accordance with any embodiment described herein as best shown in FIGS. 36A and 36B in alternative forms, and extending within the outer frame surface 106, is defined by one of the upper wall portions 116, the side wall portion 118 connected to the upper wall portion 116, and the lower wall portion 117 extending from side wall portion 118, with the side wall portion 118 connecting the lower wall portion 117 to the respective one upper wall portion 116. In these embodiments, each one of the at least one upper wall portions 116 terminates at an edge portion 120 remote from the side wall portion 118.

In addition, each respective one of the upper wall portions 116 of the plastic frame 100 also has an inner surface 121 defined between the side wall portion 118 and the respective edge portion 120. Yet still further, each respective one of the at least one upper wall portions 116 of the plastic frame 100 also has an outer surface 122 extending from the respective edge portion 120 such that the edge portion 120 connects the inner and outer surfaces 121, 122 of a respective one of the at least one upper wall portion 116 such that the inner surface 121 is located between the lower wall portion 117 and the outer surface 122. The outer surface 122 may be defined as a portion of the upper surface 107 or may be considered to extend from the upper surface 107.

In certain embodiments as shown in FIG. 36A, a plane P1 defined by the inner surface 121 of the upper wall portion 116 of the plastic frame 100 and a plane P2 defined by the inner surface 123 of the lower wall portion 117 of the plastic frame 100 extend in a direction substantially parallel to one another. In this embodiment, the gap 125 defined between the respective inner surfaces 121, 123 is consistent in a direction away from the side wall portion 118. Preferably, this gap 125 is greater than the thickness of the glass panel 30 measured from the first side 32 to the second side 34 in a direction normal to the first and second side 32, 34.

Alternatively, the plane P1 and the plane P2 of the plastic frame 100 are not parallel with one another. Accordingly, as shown in one embodiment in FIG. 36B, the gap 125 between the respective inner surfaces 121, 123 decreases along the respective planes P1, P2 in a direction away from the side wall portion 118 (i.e., the planes P1, P2 will intersect at a distance remote and inward from the side wall portion 118). Preferably, the gap 125 between the inner surfaces 121, 123 measured in a direction normal to the inner surface 123 and extending from the outer edge 124 of the inner surface 123 of the upper wall portion 116 is less than the thickness of the glass panel 30 measured from the first side 32 to the second side 34 in a direction normal to the first and second side 32, 34, while the gap 125 between the inner surfaces 121, 123 measured along a plane parallel to the side wall portion 118 and at the intersection of the respective inner surfaces 121, 123 with the side wall portion 118 is greater than the thickness of the glass panel 30.

Figure 38A:
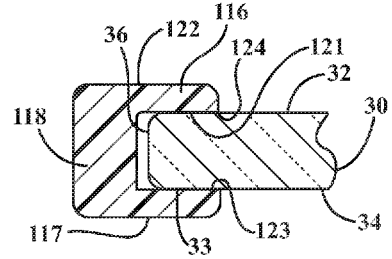
FIG. 38A is a section view of FIG. 37 taken along line 38A-38B.
Figure 38B:
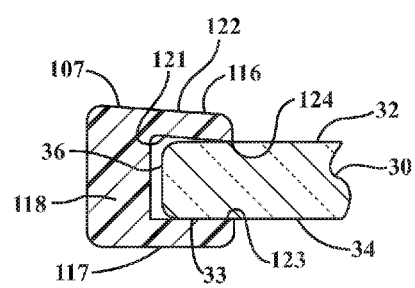
FIG. 38B is a section view of FIG. 37 taken along line 38B-38B illustrating the modified version of the C-shaped channel of FIG. 36B.
Figure 39:
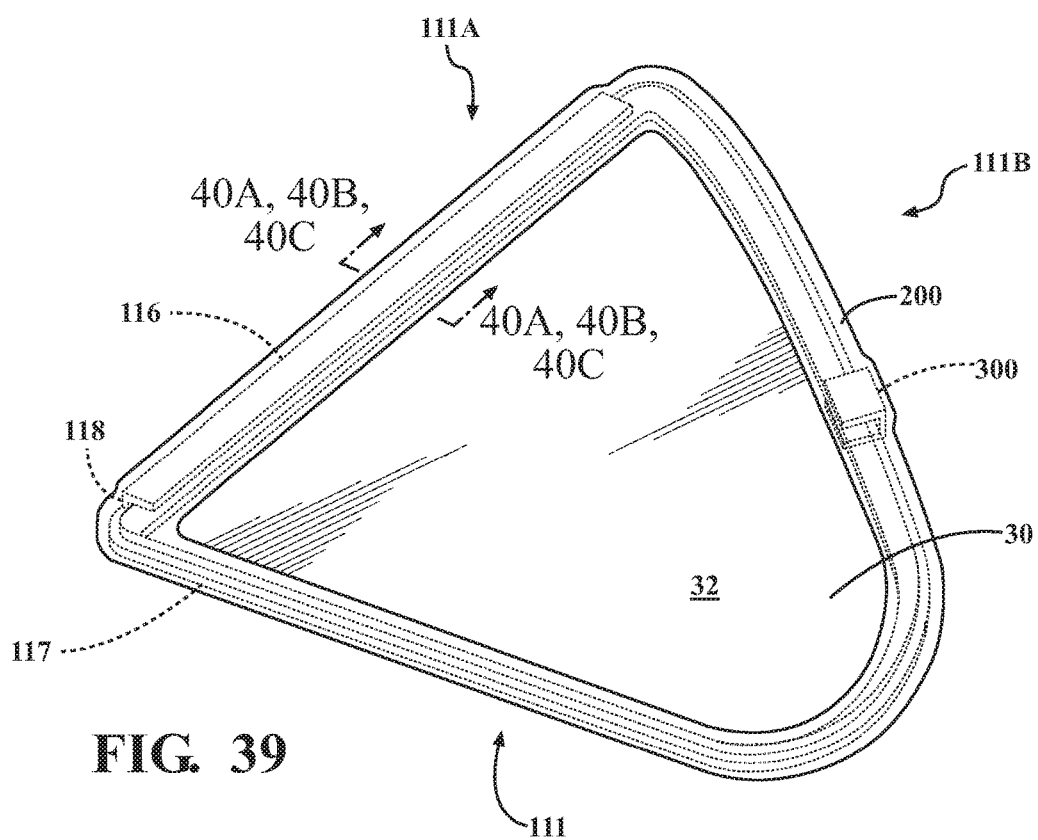
FIG. 39 is a perspective view of an encapsulated glass frame assembly including the plastic frame and clip of FIGS. 35 and 36A.

After the glass panel 30 is coupled to the plastic frame 100 and the clip 300 is coupled to the first frame side 111A, as illustrated in FIG. 37 and in FIGS. 38A and 38B, an encapsulant 200 is applied onto each of the sides 111, 111A, 111B of the plastic frame 100, onto each of the coupled clips 300, and onto at least one of the first side 32 and second side 34 of the glass panel 30 to secure the glass panel 30 to the plastic frame 100, as illustrated in FIG. 39. The encapsulant 200 can be a one-sided encapsulant (as shown in FIG. 40B), a two-sided encapsulant 200 (as shown in FIG. 40B), or a three-sided encapsulant (as shown in FIG. 40C), as described further below.

While not illustrated herein, in embodiments including a second frame side 111B including the C-shaped channel 135, at least one or all of the remaining sides 111, 111A may include a clip 300 coupled to each the respective frame side 111, 111A to aid in retaining the glass panel 30 to the plastic frame 100. Still further, at least one or all of the remaining sides 111, 111A may include just a lower wall portion 117 or may include an L-shaped channel 136 extending along all or part of the respective frame side 111, 111A, Still further, on the sides 111, 111A including either the lower wall portion 117 or L-shaped channel 136, an inlet region 160, alone or in conjunction with a recessed region 170, may also be included in the respective frame side 111, 111A as described in various embodiments above. Still further, a recessed region 170 may be included in the respective frame side 111, 111A without the corresponding inlet region 160, as also described above. Still further, in other embodiments, various combinations of all of these features may be included along one or more of the respective sides 111, 111A, with the proviso that a clip 300 is coupled to at least one of these respective sides 111, 111A in conjunction with the inclusion of the C-shaped channel 135 on a second frame side 111B as described above.

Figure 40A:
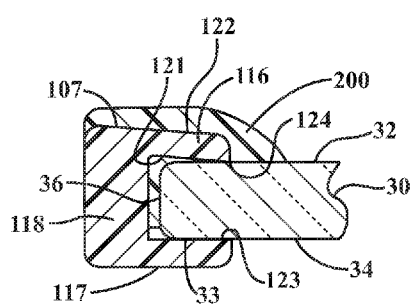
FIG. 40A is a section view of FIG. 39 taken along line 40A-40A and including a one-sided encapsulant.
Figure 40B:
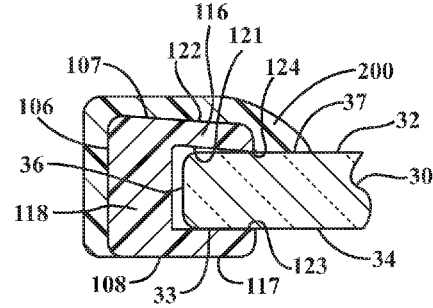
FIG. 40B is a section view of FIG. 39 taken along line 40B-40B and including a two-sided encapsulant.
Figure 40C:
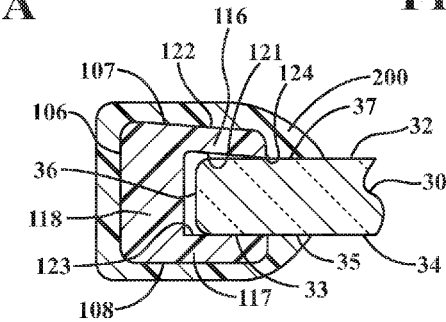
FIG. 40C is a section view of FIG. 39 taken along line 40C-40C and including a three-sided encapsulant.

As noted above, the encapsulated glass frame assembly 25 also includes an encapsulant 200 which is bonded over the plastic frame 100 and clip 300 and onto a first side 32 of the glass panel 30 (or alternatively onto the second side 34 of the glass panel 30) as a one-sided encapsulant 200 (as shown in FIG. 40A).

In certain embodiments, the encapsulant 200 is a one-sided encapsulant, as it covers a portion of the first side 32 of the glass panel 30 or alternatively onto the second side 34 of the glass panel 30 but is not coupled to in a position corresponding to the edge 36 of the glass panel 30 or a second one of the first and second side 32, 34 of the glass panel 30. In other embodiments, the encapsulant 200 is a two-sided encapsulant, as it covers a portion of the first side 32 of the glass panel 30 or alternatively onto the second side 34 of the glass panel 30 and is coupled to the plastic frame 100 and clip 300 in a position corresponding to the edge 36 of the glass panel 30. In still further embodiments, the encapsulant 200 is also bonded onto the lower surface 108 and inner surface 109 of the lower wall portion 117 of each respective frame side 111 of the plastic frame 100 and clip 300 and onto an uncovered portion 35 of the second side 34 of the glass panel 30. In this embodiment, the encapsulant 200 alternatively be referred to as a three-sided encapsulant, as it covers a portion of both the first side 32 and second side 34 of the glass panel 30 and is coupled to the plastic frame 100 in a position corresponding to the edge 36 of the glass panel 30. Each respective type of encapsulant 200 (one-sided, two-sided and three-sided) is described as being coupled with the plastic frame of each of the embodiments as described below.

In the illustrations of the encapsulation as provided herein with respect to one-sided and two-sided encapsulants, the encapsulant 200 is illustrated as being applied to the first side 32 of the glass panel 30. Those of skill can readily recognize that the encapsulant 200 the first side 32 and second side 34 of the glass panel 20 are interchangeable, and thus the encapsulant 200 may be bonded onto the second side 34 of the glass panel 30 in the same manner as the first side 32 to form a respective one-sided or two-sided encapsulant.

Referring first to the encapsulated glass assemblies 25 according to the various embodiments having one-sided encapsulant 200 formed thereon, with respect to the frame side 111A, 111B having an L-shaped channel 136 that include and correspond to the coupled clip 300, the one-sided encapsulant 200 is bonded onto the outer clip surface 315c of the upper clip portion 302 and extends onto an uncovered portion 37 of the first side 32 of the glass panel 30 inwardly from the outer clip surface 315c (as shown, for example, in FIGS. 19A, 25A and 32A).

Still further, on frame sides 111 of the plastic frame 100 including a respective L-shaped channel 136 in areas not including the coupled clip 300, as shown, for example, in FIG. 19D, the one-sided encapsulant 200 is bonded onto the upper surface 107 of the side wall portion 118 is also bonded onto an uncovered portion 37 of the first side 32 of the glass panel 30 extending inward beyond the upper surface 107 of the side wall portion 118.

Still further, for the second frame side 111B of the plastic frame 100 that include and correspond to the C-shaped channel 135, as shown, for example, in FIG. 40A, the one-sided encapsulant 200 is bonded onto the outer surface 122 and inner surface 109 of the upper wall portion 116, and onto an uncovered portion 37 of the first side 32 of the glass panel 30 extending beyond the inner surface 109 of upper wall portion 116.

Referring next to the coupled glass assemblies according to the various encapsulated glass assemblies 25 of the present invention having a two-sided encapsulant 200 formed thereon, and with respect to the frame side 111A, 111B having a lower wall portion 177 and optionally a side wall portion 118 (i.e., an L-shaped channel 136) that include and correspond to the coupled clip 300, the two-sided encapsulant 200 is bonded onto an outer clip surface 315b of the middle clip portion 306, onto the outer clip surface 315a of the upper clip portion 302, and extends onto an uncovered portion 37 of the first side 32 of the glass panel 30 inwardly from the outer clip surface 315a (as shown, for example, in FIGS. 13A, 19B, 25B and 32B).

Still further, on frame sides 111, 111A including just a lower wall portion 117, or along portions of the frame sides 111, 111A including the lower wall portion 117 not corresponding to the coupled clip 300, the two-sided encapsulant 200 is also bonded onto an outer surface 110 of the lower wall portion 117, the edge 36 of the glass panel 30 corresponding to the respective frame side 111, 111A, and onto an uncovered portion 37 of the first side 32 of the glass panel 30 extending from the edge 36 corresponding to the respective frame side 111, 111A (as shown, for example, in FIG. 13C).

Figure 19E:
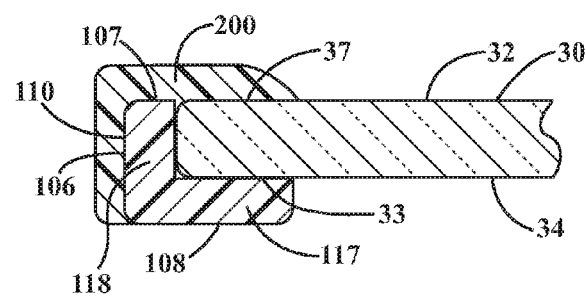
FIG. 19E is a section view of FIG. 18 taken along line 19E-19E and including a two-sided encapsulant.

Still further, on frame sides 111, 111A of the plastic frame 100 including a respective L-shaped channel 136 not corresponding to the coupled clip 300 (or sides 111, 111A not including a coupled clip 300), as shown in FIG. 19E, the two-sided encapsulant 200 is bonded onto the outer surface 106, 110 of the side wall portion 107, onto the upper surface 107 of the side wall portion 118, and is also bonded onto an uncovered portion 37 of the first side 32 of the glass panel 30 extending inward beyond the upper surface 107 of the side wall portion 118.

Even still further, on frame sides 111B including and corresponding to the C-shaped channel 135, as shown in FIG. 40B, the two-sided encapsulant 200 is bonded onto the outer surface 106, 110 of the side wall portion 118, the outer surface 122 and inner surface 109 of the upper wall portion 116, and onto an uncovered portion 37 of the first side 32 of the glass panel 30 extending beyond the inner surface 109 of upper wall portion 116.

Referring next to the encapsulated glass assemblies 25 according to the various embodiments having a three-sided encapsulant 200 formed thereon, and with respect to the frame side 111A, 111B that includes and correspond to the coupled clip 300, the three-sided encapsulant 200 is bonded onto an outer clip surface 315c of the lower clip portion 304, an outer clip surface 315b of the middle clip portion 306, an outer clip surface 315a of the upper clip portion 302, an uncovered portion 37 of the first side 32 of the glass panel 30 inwardly from the outer clip surface 315c, and onto an uncovered portion 35 of the second side 34 of the glass panel 30 inwardly from the outer clip surface 315a. (as shown, for example, in FIGS. 13B, 19C, 25C and 32C).

Still further, on frame sides 111, 111A including just a lower wall portion 117 or on frame sides 111, 111A including the lower wall portion 117 and not corresponding to the coupled clip 300, the three-sided encapsulant 200 is bonded onto an outer surface 106, 110 and lower surface 108 of the lower wall portion 117, the edge 36 of the glass panel 30 corresponding to the respective frame side 111, 111A, and onto an uncovered portion 37 of the first side 32 of the glass panel 30 extending from the edge 36 corresponding to the respective frame side 111, 111A. In addition, the three-sided encapsulant 200 is bonded onto the lower surface 108 and inner surface 109 of the lower wall portion 117 and onto the uncovered portion 35 of the second side 34 of the glass panel 30 extending inwardly from the inner surface 109 of the lower wall portion 117 (as shown in FIG. 13D).

Figure 19F:
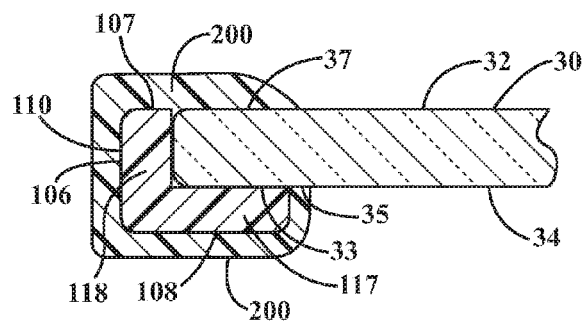
FIG. 19F is a section view of FIG. 18 taken along line 19F-19F and including a three-sided encapsulant.

Still further, on frame sides 111, 111A of the plastic frame 100 including a respective L-shaped channel 136 not corresponding to the coupled clip 300 (or sides 111, 111A not including a coupled clip 300), as shown in FIG. 19F, the three-sided encapsulant 200 is bonded onto the outer surface 106, 110 of the side wall portion 118, the upper surface 107, 122 of the side wall portion 118, and onto the lower surface 108 and inner surface 109 of the lower wall portion 117. In addition, the three-sided encapsulant 200 is also bonded onto an uncovered portion 37 of the first side 32 of the glass panel 30 extending inward beyond the upper surface 107 of the side wall portion 118 and onto the uncovered portion 35 of the second side 34 of the glass panel 30 extending inwardly from the inner surface 109 of the lower wall portion 117.

Still further, on frame sides 111B including and corresponding to the C-shaped channel 135, as shown in FIG. 40C, the encapsulant 200 is bonded onto the outer surface 106, 110 of the side wall portion 118, the outer surface 107, 122 and inner surface 109 of the upper wall portion 116, the lower surface 108 and inner surface 109 of the lower wall portion 117, an uncovered portion 37 of the first side 32 of the glass panel 30 extending beyond the inner surface 109 of upper wall portion 116, and onto the uncovered portion 35 of the second side 34 of the glass panel 30 extending inwardly from the inner surface 109 of the lower wall portion 117.

As noted above, in addition to the glass panel 30 and plastic frame 100 as described above in accordance with any embodiment, the encapsulated glass assembly 25 also includes an encapsulant 200 which is bonded to at least one of the first side 32 and the second side 34 of the glass panel 30 and which is also bonded to the outer surface of the plastic frame 100 and therefore secures the glass panel 30 to the plastic frame 100.

The encapsulant 200 has a Shore hardness that is less than the Shore Hardness of the respective plastic frame 100. In other words, the encapsulant 200 is softer than the respective plastic frame 100. Still further, the encapsulant 200 sealingly bonds to the glass panel 30 and therefore provides a moisture seal to prevent water migration between the glass panel 30 and the encapsulant 200 that could not be achieved using polypropylene encapsulants.

The Shore Hardness of the encapsulant 200 is dependent upon the composition of the encapsulating material used to form the encapsulant 200. However, as noted above, the Shore hardness of the encapsulant 200, in any embodiment of the present invention as described above and regardless of the composition of the encapsulating material used to form the encapsulant, is less than the Shore hardness of the plastic frame 100.

In certain embodiments, the encapsulating material used to form the encapsulant 200 is a thermoplastic elastomer, or TPE (i.e., it is a TPE-based encapsulating material). Accordingly, in these embodiments, the encapsulant 200 is, or otherwise may be referred to, as TPE. Exemplary TPE-based materials that can be used as the encapsulating material is SBS (poly(styrene-butadiene-styrene), also alternatively referred to as a styrene-butadiene-styrene block copolymer), and SEBS (styrene-ethylene-butylene-styrene block copolymers). Exemplary TPE materials such as SBS and SEBS form encapsulants 200 having a Shore hardness ranging from 0 A to 60 D, as measured in accordance with ASTM D2240.

To form the encapsulant 200 from the encapsulating material and in accordance with any of the embodiments above, in one exemplary method of the present invention, after the glass panel 30 and the clip or clips 300 are installed within the respective plastic frame 100, the installed glass panel 30, clips 300 and plastic frame 100 are placed into a mold (not shown), such an injection mold, wherein an encapsulant 200 is molded onto one or both of the first side 32 and second side 34 of the glass panel 30 and onto the outer surface of the plastic frame 100 and onto the outer surface 315 of the clips 300 to sealingly secure the plastic frame 100 to the glass panel 30. The encapsulant 200 is formed by introducing the encapsulating material, as described above, in a flowable or liquid form and at a desired pressure within the cavity portion of the mold and onto the at least one of the first side and the second side of the glass panel and onto the outer surface of the plastic frame 100. To ensure that the encapsulating material (which is non-flowable and/or non-liquid at temperatures such as room temperature or ambient temperature and also at temperatures typically experienced by vehicles to which it is coupled during operating conditions) is in a flowable or a liquid form for introduction into the cavity of the mold, the encapsulating material is first heated to a flowable temperature sufficient to wherein the encapsulating material is in flowable and/or a liquid form. The desired pressure is sufficient to allow the encapsulating material to fill the cavity portion of the mold and contact the portions of the glass panel 30, clips 300 and plastic frame 100 for bonding as desired but insufficient to cause premature opening of the mold and flash. Once the encapsulating material is cooled to harden the encapsulating material from its liquid or its flowable form to a non-liquid (i.e., solid) or non-flowable form to form the encapsulant 200, the encapsulated glass assembly 25 may be removed from the mold. In most plastics used as the encapsulating material herein, the flowable temperature of the encapsulating material corresponds to a temperature greater than its glass transition temperature, and thus the encapsulating material is introduced at a temperature above its glass transition temperature to fill the cavity, and subsequently cooled to a temperature below its glass transition temperature to form the encapsulant 200.

Optionally, the encapsulant 200 may be formed in a single step or in multiple steps in associated exemplary methods for application of the present invention. For example, a first encapsulating material may be applied to a first portion of the respective frame 100, the outer surface 315 of the clips 300, and to one of the first side 32 or second side 34 the glass panel 30, and a second encapsulating material 200 may be applied to another portion of the respective frame 100, the outer surface 315 of any additional clips 300, and to other one of the first side 32 or second side 34 of the glass panel. In further embodiments, the first and second encapsulating material may be integrally formed, while in further embodiments the first and second encapsulating material may form separate encapsulants 200 for the encapsulated glass assembly 25, but wherein the first and second encapsulating materials form a single integral encapsulant 200. In certain embodiments, the first encapsulating material and the second encapsulating material, when separately applied, are formed from the same polymeric material. In yet further embodiments, the first encapsulating material and second encapsulating material are formed from different polymeric materials.

The temperatures and pressures used to form the encapsulant 200 within the mold, and in particular within the injection mold in accordance with one exemplary method of application, are dependent upon numerous factors, including but not limited to the type of encapsulating material used, the type of characteristics of the molding equipment used (including mold temperature, melt temperature, nozzle temperature, zone temperatures, and feed temperatures), and to a lesser extent the desired shape and thickness of the encapsulant 200 applied onto the glass panel 100, clips 300 and glass panel 30. Notably, because the encapsulating material used to form the encapsulant 200 as described above may be molded at relatively low pressures and temperatures within the mold, such as the injection mold described above, the risk of cracking or breaking the glass panel 30 during the molding process is minimized or prevented.

Exemplary injection molding equipment having these molding characteristics that may be used in the exemplary application methods of the present invention include, but are not limited, those sold commercially from Krauss-Maffei Corporation of Munich, Germany (described above with respect to molding the plastic frame 100).

When TPEs such as SBS or SEBS are utilized as the encapsulating material (i.e., the encapsulating material is a TPE-based encapsulating material such as SBS or SEBS) and the material is injection molded onto the glass panel using conventional injection molding equipment (such as those sold commercially from Krauss-Maffei Corporation), in one exemplary method of the present invention, the molding conditions are as follows: mold temperatures ranging from about 100 to 130 degrees Fahrenheit (about 38 to 55 degrees Celsius); injection pressures ranging from about 3000 to 4500 pounds per square inch (about 2.07 to 3.10 MPa (MegaPascals)); barrel temperatures ranging from about 400 to 430 degrees Fahrenheit (about 204 to 221 degrees Celsius), and fill times ranging from 2.1 to 2.6 seconds.

Notably, these injection pressures are generally lower than the corresponding injection pressures, at corresponding or lower barrel temperatures and at slower fill times, as compared with molding conditions required to mold polypropylene encapsulants onto glass as described above. Improvement in any one of the factors (lower injection pressure; lower molding and barrel temperatures; and increased fill times) much less a combination of any two or more of these factors, is believed to decrease the risk of glass panel 30 breakage during the molding process.

After cooling, the mold is released, and the encapsulated glass assembly 25 is formed that includes the glass panel 30, clips 300, plastic frame 100, and the encapsulant 200.

The present invention thus provides simplified glass assemblies having high strength and a simplified manufacturing process. In addition, the coupling of the plastic frame and encapsulant to the glass panel in accordance with the present invention forms glass assemblies with high strength that cannot be achieved using the one-shot or two-shot encapsulation techniques that form softer enclosures. Still further, the application of the encapsulating material to form an encapsulant onto the glass panel and frame to secure the glass panel to the frame in accordance with the present invention may be done at lower temperatures and pressures than required to bond high hardness plastic materials such as polypropylene to the glass panel as the encapsulant, thus minimizing or preventing the breakage of the glass panels during the application process. Accordingly, the present invention allows the use of lower strength and better acoustical glass panels, such as laminated glass panels, in this manufacturing process.

The present invention has been described herein in an illustrative manner. It is to be understood that the terminology that has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An encapsulated glass assembly comprising:
a glass panel having a first side and a second side and an edge between said first side and said second side, wherein the glass panel comprises a laminated glass panel or a tempered glass panel;
a plastic frame coupled to said glass panel, said plastic frame having at least three frame sides and having a corner located between each adjacent pair of said at least three frame sides and including an outer frame surface, said outer frame surface including a lower wall portion extending from said outer frame surface along each of said at least three frame sides, said lower wall portion including a lower surface;
a clip coupled to said first frame side of said at least three frame sides of said plastic frame, said clip comprising an upper clip portion, a lower clip portion and a middle clip portion connecting said upper clip portion to said lower clip portion, wherein an inner clip surface of said middle clip portion, said upper clip portion and said lower clip portion of said clip define a first C-shaped clip channel, said clip including an outer clip surface opposite said inner clip surface, and wherein a portion of said glass panel is contained within said first C-shaped clip channel, and wherein a portion of said first side of said glass panel is directly adjacent to said inner clip surface of said upper clip portion; and
an encapsulant bonded onto at least one of said first side and said second side of said glass panel, said outer frame surface of said plastic frame, and said outer clip surface of said clip to secure said glass panel to said plastic frame, said encapsulant having a Shore hardness less than a Shore hardness of said plastic frame.

2. The encapsulated glass assembly of claim 1 further comprising an additional clip coupled to a second frame side of said at least three frame sides of said plastic frame, said additional clip the same or different from said clip, said additional clip comprising an inner clip surface and an opposing outer clip surface and a middle clip portion coupling said upper clip portion to said lower clip portion, wherein said inner clip surface of said middle clip portion, said upper clip portion and said lower clip portion of said additional clip defines a second C-shaped clip channel, wherein another portion of said glass panel is contained within said second C-shaped clip channel; and
wherein said encapsulant is also bonded onto said outer clip surface of said additional clip to secure said glass panel to said plastic frame.

3. The encapsulated glass assembly according to claim 1, wherein said inner clip surface of said lower clip portion of said clip is positioned adjacent to said lower surface of said lower wall portion on said first frame side of said plastic frame when said clip is coupled to said first frame side of said plastic frame.

4. The encapsulated glass assembly according to claim 1, wherein a portion of said lower surface of said lower wall portion on said first frame side of said plastic frame includes a recessed region, and wherein said lower clip portion of said clip is positioned within said recessed region when said clip is coupled to said first frame side of said plastic frame.

5. The encapsulated glass assembly according to claim 4, wherein said outer surface of said lower clip portion of said clip is coplanar with said outer surface of said lower wall portion on said first frame side of said plastic frame when said clip is coupled within said recessed region.

6. The encapsulated glass assembly according to claim 1, wherein said first frame side of said plastic frame includes an inlet region extending within said lower wall portion, and wherein said clip is coupled within said inlet region on said first frame side of said plastic frame.

7. The encapsulated glass assembly according to claim 6, wherein a portion of said lower surface of said lower wall portion on said first frame side of said plastic frame extending inwardly from said inlet region includes a recessed region, and wherein an outward portion of said lower clip portion of said clip is positioned within said recessed region when said clip is coupled to said first frame side of said plastic frame.

8. The encapsulated glass assembly according to claim 1, wherein said first frame side of said plastic frame includes a side wall portion connected to said lower wall portion, wherein said side wall portion and said lower wall portion define an L-shaped channel, and wherein said inner clip surface of said lower clip portion of said clip is positioned adjacent to a lower surface of said lower wall portion on said first frame side of said plastic frame and said inner clip surface of said middle clip portion is positioned adjacent to an outer surface of said side wall portion when said clip is coupled to said L-shaped channel on said first frame side of said plastic frame.

9. The encapsulated glass assembly according to claim 1, wherein a third frame side of said at least three frame sides distinct from said first frame side and said second frame side includes said lower wall portion having said lower surface, and wherein a portion of said second side of said glass panel is positioned adjacent to said inner surface of said lower wall portion when said glass panel is coupled to said plastic frame.

10. The encapsulated glass assembly according to claim 1, wherein a third frame side of said at least three frame sides distinct from said first frame side and said second frame side includes a side wall portion connected to said lower wall portion, wherein said side wall portion and said lower wall portion of said third frame side define an L-shaped channel, and wherein a portion of said second side of said glass panel is positioned adjacent to an inner surface of said lower wall portion and said edge of said glass panel is positioned adjacent to an inner surface of said side wall portion of said L-shaped channel of said third frame side when said glass panel is coupled to said plastic frame.

11. The encapsulated glass assembly according to claim 10, wherein a third frame side of said at least three frame sides distinct from said first frame side and said second frame side includes another side wall portion connected to said lower wall portion, wherein said another side wall portion and said lower wall portion define another L-shaped channel along said third frame side, and wherein a portion of said second side of said glass panel is positioned adjacent to an inner surface of said lower wall portion on said third frame side and said edge of said glass panel is positioned adjacent to an inner surface of said another side wall portion of said additional L-shaped channel when said glass panel is coupled to said plastic frame.

12. The encapsulated glass assembly according to claim 1 wherein said encapsulant is bonded onto each of said first side and said second side of said glass panel.

13. A vehicle including the encapsulated glass assembly of claim 1.

14. An encapsulated glass assembly comprising:
a glass panel having a first side and a second side and an edge between said first side and said second side, wherein the glass panel comprises a laminated glass panel or a tempered glass panel;
a plastic frame coupled to said glass panel, said plastic frame having at least three frame sides and having a corner located between each adjacent pair of said at least three frame sides and including an outer frame surface, said outer frame surface including a lower wall portion extending from said outer frame surface, said lower wall portion having a lower surface;
wherein a first frame side of said at least three sides includes said lower wall portion having said lower surface;
wherein a second frame side of the at least three sides includes a side wall portion connected to said lower wall portion and at least one upper wall portion extending from a portion of an upper length of said side wall portion on said second frame side, wherein an inner surface of one of said at least one upper wall portion, said side wall portion and said lower wall portion define a respective C-shaped channel, wherein a portion of said glass panel is contained within said respective C-shaped channel when said plastic frame is coupled to said plastic frame;
a clip coupled to said first frame side of said at least three frame sides of said plastic frame, said clip comprising an upper clip portion, a lower clip portion and a middle clip portion connecting said upper clip portion to said lower clip portion, wherein an inner clip surface of said middle clip portion, said upper clip portion and said lower clip portion of said clip define a C-shaped clip channel, said clip including an outer clip surface opposite said inner clip surface, and wherein another portion of said glass panel is contained within said C-shaped clip channel, and wherein a portion of said first side of said glass panel is directly adjacent to said inner clip surface of said upper clip portion; and
an encapsulant bonded onto at least one of said first side and said second side of said glass panel, said outer frame surface of said plastic frame, and said outer clip surface of said clip to secure said glass panel to said plastic frame, said encapsulant having a Shore hardness less than a Shore hardness of said plastic frame.

15. The encapsulated glass assembly according to claim 14, wherein said inner clip surface of said lower clip portion of said clip is positioned adjacent to said lower surface of said lower wall portion on said first frame side of said plastic frame when said clip is coupled to said first frame side of said plastic frame.

16. The encapsulated glass assembly according to claim 14, wherein a portion of said lower surface of said lower wall portion on said first frame side of said plastic frame includes a recessed region, and wherein said lower clip portion of said clip is positioned within said recessed region when said clip is coupled to said first frame side of said plastic frame.

17. The encapsulated glass assembly according to claim 16, wherein said outer surface of said lower clip portion of said clip is coplanar with said outer surface of said lower wall portion on said first frame side of said plastic frame when said clip is coupled within said recessed region.

18. The encapsulated glass assembly according to claim 14, wherein said first frame side of said plastic frame includes an inlet region extending within said lower wall portion, and wherein said clip is coupled within said inlet region on said first frame side of said plastic frame.

19. The encapsulated glass assembly according to claim 18, wherein a portion of said lower surface of said lower wall portion on said first frame side of said plastic frame extending inwardly from said inlet region includes a recessed region, and wherein an outward portion of said lower clip portion of said clip is positioned within said recessed region when said clip is coupled to said first frame side of said plastic frame.

20. The encapsulated glass assembly according to claim 14, wherein said first frame side of said plastic frame includes a side wall portion connected to said lower wall portion, wherein said side wall portion and said lower wall portion define an L-shaped channel, and wherein said inner clip surface of said lower clip portion of said clip is positioned adjacent to a lower surface of said lower wall portion on said first frame side of said plastic frame and said inner clip surface of said middle clip portion is positioned adjacent to an outer surface of said side wall portion when said clip is coupled to said L-shaped channel on said first frame side of said plastic frame.

21. The encapsulated glass assembly according to claim 14, wherein a third frame side of said at least three frame sides distinct from said first frame side and said second frame side includes said lower wall portion having said lower surface, and wherein a portion of said second side of said glass panel is positioned adjacent to said inner surface of said lower wall portion when said glass panel is coupled to said plastic frame.

22. The encapsulated glass assembly according to claim 14, wherein a third frame side of said at least three frame sides distinct from said first frame side and said second frame side includes a side wall portion connected to said lower wall portion, wherein said side wall portion and said lower wall portion of said third frame side define an L-shaped channel, and wherein a portion of said second side of said glass panel is positioned adjacent to an inner surface of said lower wall portion and said edge of said glass panel is positioned adjacent to an inner surface of said side wall portion of said L-shaped channel of said third frame side when said glass panel is coupled to said plastic frame.

23. The encapsulated glass assembly according to claim 22, wherein said third frame side of said at least three frame sides distinct from said first frame side and said second frame side includes another side wall portion connected to said lower wall portion, wherein said another side wall portion and said lower wall portion define another L-shaped channel along said third frame side, and wherein a portion of said second side of said glass panel is positioned adjacent to an inner surface of said lower wall portion on said third frame side and said edge of said glass panel is positioned adjacent to an inner surface of said another side wall portion of said additional L-shaped channel when said glass panel is coupled to said plastic frame.

24. The encapsulated glass assembly according to claim 14, wherein said encapsulant is bonded onto each of said first side and said second side of said glass panel.

25. A vehicle including the encapsulated glass assembly of claim 14.

26. A method for forming an encapsulated glass assembly including a glass panel having a first and a second side and an edge connecting the first side to the second side, said method comprising:
- forming a plastic frame having at least three frame sides and having a corner between each adjacent frame side and including an outer frame surface, the outer frame surface including a lower wall portion extending from the outer frame surface along each of the at least three frame sides, the lower wall portion including a lower surface;
- introducing the glass panel onto the formed plastic frame such that a second side of the glass panel is adjacent to an inner surface of the lower wall portion along each of the at least three frame sides of the plastic frame;
- providing a clip comprising an upper clip portion, a lower clip portion and a middle clip portion connecting the upper clip portion to the lower clip portion, wherein an inner clip surface of the middle clip portion, the upper clip portion and the lower clip portion of the clip defines a C-shaped clip channel;
- coupling the clip to a first frame side of the at least three frame sides of the plastic frame such that a portion of the glass panel is contained within the C-shaped clip channel and such that a portion of the first side of the glass panel is directly adjacent to the inner clip surface of the upper clip portion;
- introducing an encapsulating material at a temperature greater than the glass transition temperature of the encapsulating material onto the at least one of the first side and the second side of the glass panel, onto the outer frame surface of the plastic frame, and onto the outer clip surface of the clip; and
- cooling the encapsulating material to a temperature below the glass transition temperature of the encapsulating material to form an encapsulant that secures the glass panel to the plastic frame, the encapsulant bonded to the at least one of the first side and the second side of the glass panel and bonded onto the outer frame surface of the plastic frame and bonded onto the outer clip surface of each one of the pair of clips, the encapsulant having a Shore hardness less than a Shore hardness of the plastic frame.

* * * * *

UNITED STATES PATENT AND TRADEMARK OFFICE
CERTIFICATE OF CORRECTION

PATENT NO.        : 10,119,323 B2
APPLICATION NO.   : 15/486474
DATED             : November 6, 2018
INVENTOR(S)       : David W. Lahnala et al.

Page 1 of 1

It is certified that error appears in the above-identified patent and that said Letters Patent is hereby corrected as shown below:

In the Claims

Claim 14, Column 25, Line 32, please delete "plastic frame is coupled" and replace with -- glass panel is coupled --

Signed and Sealed this
Eighth Day of January, 2019

Andrei Iancu
*Director of the United States Patent and Trademark Office*